US010430867B2

(12) United States Patent
Mitchell et al.

(10) Patent No.: US 10,430,867 B2
(45) Date of Patent: Oct. 1, 2019

(54) VIRTUAL GARMENT CAROUSEL

(71) Applicant: SelfieStyler, Inc., San Francisco, CA (US)

(72) Inventors: Kyle Mitchell, Charlotte, NC (US); Julianne Applegate, Matawan, NJ (US); Muhammad Ibrahim, Karachi (PK); Waqas Muddasir, Karachi (PK); Jeff Portaro, Lexington, NC (US); Dustin Ledo, Charlotte, NC (US)

(73) Assignee: SelfieStyler, Inc., San Francisco, CA (US)

( * ) Notice: Subject to any disclaimer, the term of this patent is extended or adjusted under 35 U.S.C. 154(b) by 0 days.

(21) Appl. No.: 15/684,772

(22) Filed: Aug. 23, 2017

(65) Prior Publication Data

US 2017/0352092 A1 Dec. 7, 2017

Related U.S. Application Data

(63) Continuation-in-part of application No. 15/083,232, filed on Mar. 28, 2016, now Pat. No. 9,905,019.
(Continued)

(51) Int. Cl.
*G06Q 30/06* (2012.01)
*G06T 11/60* (2006.01)
(Continued)

(52) U.S. Cl.
CPC ....... *G06Q 30/0643* (2013.01); *G06F 3/0482* (2013.01); *G06T 11/60* (2013.01);
(Continued)

(58) Field of Classification Search
CPC ... G06F 3/0482; G06Q 30/0643; G06T 11/60; G06T 15/503; G06T 19/00; G06T 19/20;
(Continued)

(56) References Cited

U.S. PATENT DOCUMENTS 5,937,081 A * 8/1999 O'Brill .................. G06T 11/00
345/632
6,546,309 B1 4/2003 Gazzuolo
(Continued)

FOREIGN PATENT DOCUMENTS

| EP | 1 352 347 B1 | 10/2003 |
| WO | WO 02/057964 A2 | 7/2002 |
| WO | WO 14/037939 A1 | 3/2014 |

OTHER PUBLICATIONS

International Search Report dated Nov. 22, 2016, issued in connection with PCT Application No. PCT/US2016/045380 (7 pages).
EPO Search Report dated Dec. 17, 2018, issued in connection with EPO Application No. 16835652.2 (9 pages).

*Primary Examiner* — Haixia Du
(74) *Attorney, Agent, or Firm* — McDonnell Boehen Hulbert & Berghoff LLP

(57) ABSTRACT

Embodiments disclosed herein include virtual apparel fitting systems configured to perform methods comprising generating a first virtual garment carousel the includes images of garments. In operation, a user scrolling through the virtual garment carousel causes a graphical user interface to display images of the garments in the carousel superposed over an image of the user, thereby enabling the user to see how the garments would look on him or her, where virtual fit points of each garment image align with virtual fit points on the image of the user.

19 Claims, 14 Drawing Sheets

Related U.S. Application Data

(60) Provisional application No. 62/202,454, filed on Aug. 7, 2015.

(51) Int. Cl.
*G06T 15/50* (2011.01)
*G06T 19/00* (2011.01)
*G06T 19/20* (2011.01)
*G06F 3/0482* (2013.01)

(52) U.S. Cl.
CPC ............ *G06T 15/503* (2013.01); *G06T 19/00* (2013.01); *G06T 19/20* (2013.01); *G06T 2200/24* (2013.01); *G06T 2210/16* (2013.01); *G06T 2219/2004* (2013.01)

(58) Field of Classification Search
CPC ............ G06T 2200/24; G06T 2210/16; G06T 2219/2004
See application file for complete search history.

(56) References Cited

U.S. PATENT DOCUMENTS

| | | | |
|---|---|---|---|
| 9,405,446 B1 * | 8/2016 | Haitani | G06F 3/04842 |
| 2002/0130890 A1 | 9/2002 | Karatassos | |
| 2007/0182736 A1 | 8/2007 | Weaver | |
| 2007/0294142 A1 * | 12/2007 | Kattner | G06Q 30/06 |
| | | | 705/27.2 |
| 2012/0086783 A1 | 4/2012 | Sareen | |
| 2012/0188372 A1 | 7/2012 | Ozkul et al. | |
| 2012/0313969 A1 | 12/2012 | Szymczyk | |
| 2013/0305547 A1 | 11/2013 | Grove | |
| 2014/0176565 A1 * | 6/2014 | Adeyoola | G06T 19/006 |
| | | | 345/473 |
| 2014/0358738 A1 | 12/2014 | Ohnemus | |
| 2015/0256633 A1 * | 9/2015 | Chand | G06K 9/00536 |
| | | | 382/103 |
| 2015/0269759 A1 | 9/2015 | Sekine | |
| 2016/0202885 A1 * | 7/2016 | Park | G06F 3/0482 |
| | | | 715/810 |
| 2017/0352092 A1 * | 12/2017 | Mitchell | G06T 15/503 |

\* cited by examiner

VIRTUAL GARMENT CAROUSEL

CROSS-REFERENCE TO RELATED APPLICATIONS

This application is a continuation-in-part of U.S. application Ser. No. 15/083,232 titled "Virtual Apparel Fitting Systems and Methods," filed on Mar. 28, 2016, and currently pending. U.S. application Ser. No. 15/083,232 claims priority to provisional application 62/202,454 titled "Virtual Apparel Fitting Systems and Methods" filed on Aug. 7, 2015. The entire contents of the Ser. No. 15/083,232 and 62/202,454 applications are incorporated herein by reference.

FIELD

The embodiments disclosed herein relate to the field of online shopping of apparel, including systems and methods that allow a user to try on garments in a virtual garment carousel to find a desired fit when purchasing the garment online.

BACKGROUND

As many online shoppers know, ordering products from the Internet can sometimes be a gamble. This is often true for retail clothing. Many consumers order garments online in what is advertised in their "typical" size only to find that the garment does not fit when it arrives. With the increasing number of styles and manufacturers of clothing available today, standard size information is becoming an increasingly poor indicator of the likelihood that a particular-sized garment will fit. Indeed, 50-70% of returns are due to poor fit, and 72% of people who do not shop online are afraid of poor fit and look.

There have been attempts to address this problem for both consumers and retailers since online shopping became available. Despite these contributions, however, the current online retail clothing shopping experience does not provide options for size and/or style selection that are any more reliable than its predecessor, the mail order catalogue. Thus, there remains a need in the art for technology that provides for more informed size selection during online apparel shopping.

SUMMARY

The embodiments herein involve, but are not limited to, providing a virtual garment carousel to online shoppers (users) in an Internet environment. The embodiments may allow users to view an image of him or herself wearing clothes via a computing device (e.g., a smartphone, tablet computer, laptop, or desktop computer), allowing for more reliable online purchasing.

Some embodiments include generating a first virtual garment carousel for a user. The first virtual garment carousel includes a plurality of garment images of a first type of garment. Some embodiments further include generating a first composite image of the user wearing a first outfit comprising a first garment and a second garment, where (i) the first composite image includes a user image, a first garment image, and a second garment image, (ii) the first garment image includes a garment image in the first virtual garment carousel, (iii) the second garment image includes an image of a second type of garment, and (v) the garment fit points in the first and second garment images align with corresponding fit points in the user image. Some embodiments may further include displaying the first composite image in a graphical user interface.

Some embodiments further include receiving a garment change command via the graphical user interface to change from the first garment image to a next garment image in the first virtual garment carousel, and in response to receiving the garment change command, generating a second composite image of the user wearing a second outfit comprising the second garment and a third garment, where (i) the second composite image includes the user image, the second garment image, and a third garment image, (ii) the third garment image is the next garment image in the first virtual garment carousel, and (iii) the garment fit points of the second and third garment images align with corresponding fit points in the user image. Some embodiments may further involve displaying the second composite image in the graphical user interface.

Further embodiments include tangible, non-transitory computer-readable media having stored thereon program instructions that, upon execution by a computing device, cause the computing device to perform the features and functions disclosed and described herein.

Some embodiments include a computing device comprising at least one processor, as well as data storage and program instructions. In operation, the program instructions are stored in the data storage, and upon execution by the at least one processor, cause the computing device (individually or in combination with other components or systems) to perform the features and functions disclosed and described herein.

This overview is illustrative only and is not intended to be limiting. In addition to the illustrative aspects, embodiments, and features described herein, further aspects, embodiments, and features will become apparent by reference to the figures and the following detailed description. The features and advantages of the disclosed systems and methods, as well as other aspects, advantages, and alternatives will become apparent to those of ordinary skill in the art by reading the following detailed description, with reference where appropriate to the accompanying drawings.

DETAILED DESCRIPTION

Figure 1:
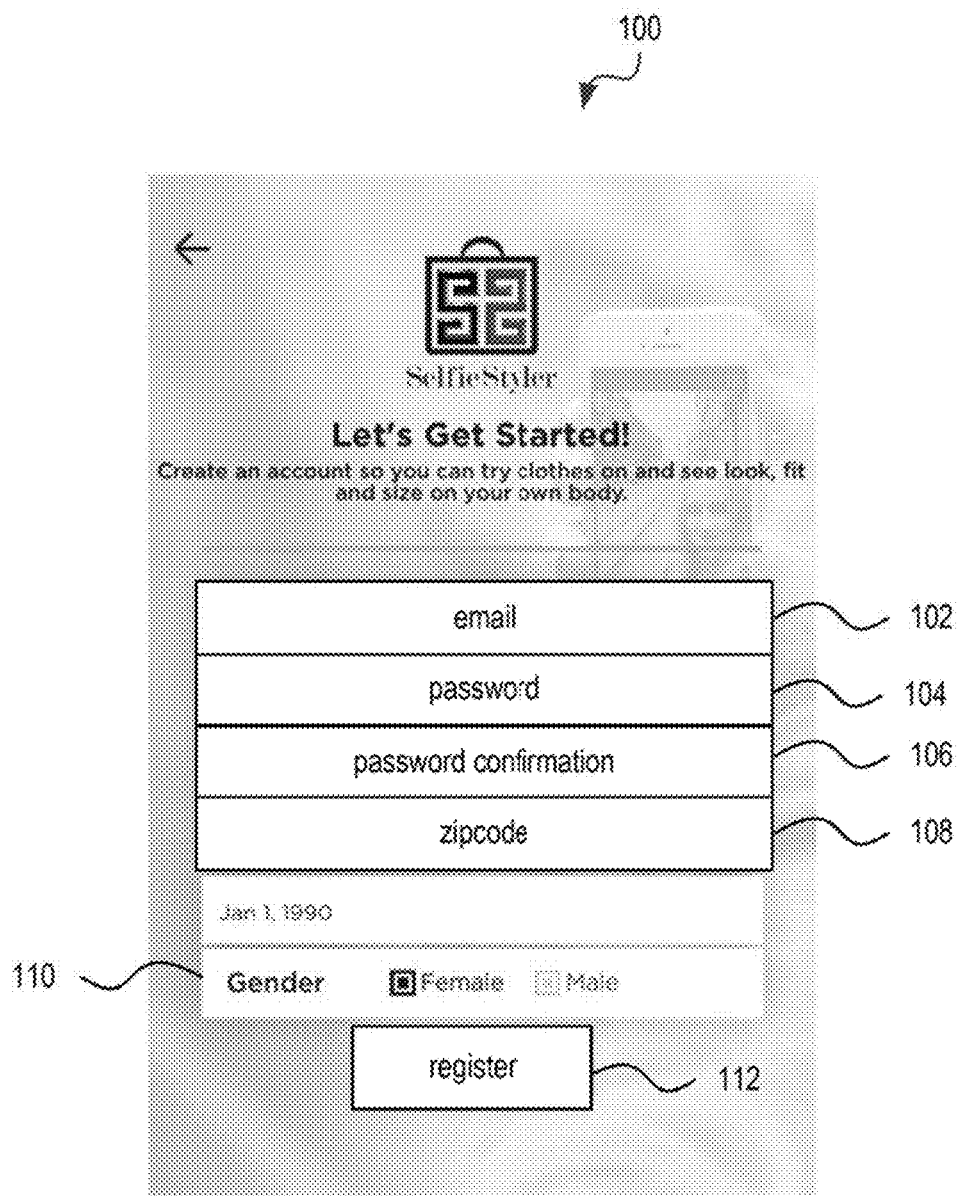
FIG. 1 is a screen shot of a GUI showing an example user registration screen according to some embodiments.

The embodiments shown, disclosed, and described in the figures and specification are set forth only as examples. As such, those skilled in the art will appreciate that other arrangements and elements (e.g., machines, interfaces, functions, orders, and groupings of functions) can be used instead, and that some elements may be omitted altogether. Further, many of the elements shown and described herein are functional entities that may be implemented as discrete or distributed components or in conjunction with other components, and in any suitable combination and location. Various functions described herein as being performed by one or more entities may be carried out by hardware, firmware, and/or software (and any combination thereof). For example, one or more processors executing instructions stored in one or more tangible computer-readable memory components may implement one or more of the features and functions described herein.

Some embodiments comprise tangible, non-transitory computer readable media comprising instructions encoded thereon, where the instructions, when executed by one or more processors, cause one or more computing devices (for example, a user's computing device individually or in combination with a server system, or perhaps a server system individually or in combination with a user's computing device) to execute one or more methods comprising a series of one or more processes and/or sub-processes to generate a virtual fit for a garment for a user and display one or more images of the user wearing the garment via a graphical user interface. In some embodiments, the sub-processes (or perhaps functions thereof) may be performed successively, simultaneously, or intermittently with other sub-processes (or perhaps functions thereof). Further, it is envisioned that some of the steps and/or functions of the sub-processes may be changed, may be substituted for, may be combined with other steps and/or functions of other sub-processors, or may be eliminated. Further, it is envisioned that some sub-processes and other disclosed methods may include additional steps not explicitly shown or described herein. The methods, processes, and sub-processes described herein are merely exemplary and those skilled in the art will recognize modifications that fall within the scope and spirit of the inventions and embodiments thereof disclosed and described herein.

Some embodiments include a process comprising one or more of the following: (i) a Photo Grading Sub-Process adapted to create an array of garment images; (ii) a User Mapped Sub-Process adapted to capture a user's body measurements; (iii) a Fit Point Alignment Sub-Process adapted to align one of the garment images (and/or models) with a 2-D image (and/or 3-D model) of a user's body; (iv) a Style Patterned Sub-Process adapted to compare a virtual fit of a garment on a user's body with a manufacturer's standard fit for the garment; (v) a Preference Driven Sub-Process to account for user garment fit preferences; and (vi) a Raster Mapped 3-D Apparel Sub-Process adapted to visually illustrate a virtual fit of the garment on the user's body. An overview of each of these sub-processes is described herein followed by a detailed description of the drawings, which show various aspects of example embodiments of systems and methods implementing various virtual apparel fitting functions, including but not limited to (i) the sub-processes and/or portions and/or variations of aspects of the sub-processes and/or (ii) other functions performed by embodiments of the virtual apparel fitting systems disclosed and described herein.

Some embodiments additionally include a virtual carousel feature comprising one or more of (i) generating a first virtual garment carousel for a user, wherein the first virtual garment carousel comprises a plurality of garment images of a first type of garment; (ii) generating a first composite image of the user wearing a first outfit comprising a first garment and a second garment, wherein the first composite image comprises a user image, a first garment image, and a second garment image, wherein the first garment image is a garment image in the first virtual garment carousel, wherein the second garment image is an image of a second type of garment, and wherein garment fit points in the first and second garment images align with corresponding fit points in the user image; (iii) displaying the first composite image in a graphical user interface; (iv) receiving a garment change command via the graphical user interface to change from the first garment image to a next garment image in the first virtual garment carousel; (v) in response to receiving the garment change command, generating a second composite image of the user wearing a second outfit comprising the second garment and a third garment, wherein the second composite image comprises the user image, the second garment image, and a third garment image, wherein the third garment image is the next garment image in the first virtual garment carousel, and wherein garment fit points of the second and third garment images align with corresponding fit points in the user image; and (vi) displaying the second composite image in the graphical user interface.

Overview of Example Embodiments

Photo Grading Sub-Process

Some embodiments may comprise a Photo Grading Sub-Process that includes generating a set of 2-D garment images and/or 3-D garment models corresponding to various sizes of the garment from a single 2-D reference image and/or 3-D model of the garment. In some embodiments, the Photo-Grading Sub-Process includes one or more of: (i) capturing or otherwise obtaining at least one digital image of a garment on a mannequin; (ii) establishing a number of set points (e.g., fit points) in the digital image of the garment that are used for re-sizing the image of the garment in a virtual manner; and/or (iii) manipulating the image of the garment at one or more of the set points (or fit points) to re-size the image of the garment, where the image manipulation is based on size rules for the garment (sometimes referred to herein as garment "grade rules") as established by the manufacturer of the garment. In some embodiments, the at least one digital image of the garment on the mannequin may include multiple images of the garment on the mannequin, such as a front view image, a side view image, a rear-view image, and so on.

Some embodiments of the Photo Grading Sub-Process may additionally or alternatively include one or more of: (i) providing a mannequin having a selected clothing size; (ii)

providing a garment with the same selected clothing size as the mannequin; (iii) obtaining one or more digital images of the garment on the mannequin; (iv) scaling the image such that a desired number of pixels of the image corresponds with a 1-inch measurement (or perhaps another scale) of the garment (i.e., determining how many pixels in the image correspond to an inch of fabric in the garment on the mannequin); (v) establishing a number of set points (or fit points) for re-sizing the image of the garment; and (vi) choosing one or more of the set points and re-sizing the image of the garment by moving the chosen set points some number of pixels based on (a) the number of pixels in the image corresponding to an inch of fabric of the garment on the mannequin and (b) the size rules (or "grade rules") for the garment as established by the manufacturer of the garment.

The output of one or more functions of the Photo Grading Sub-Process is a set of garment images, where each garment image in the set corresponds to a particular size of the garment. For example, if a garment is available in sizes 0, 2, 4, 6, and 8, then the set of garment images includes a garment image for size 0 of the garment, a garment image for size 2 of the garment, a garment image for size 4 of the garment, a garment image for size 6 of the garment, and a garment image for size 8 of the garment. In operation, from a single "reference" image of the garment on a mannequin of the same garment size, a virtual apparel fitting system configured to execute one or more functions of the above-described Photo Grading Sub-Process generates a set of garment images for the garment based on one or more fit points in the reference image and the manufacturer's grade rules for the garment, where each garment image looks as though it was photographed on an appropriately-sized mannequin. For example, the garment image for size 2 of the garment looks as though it was photographed on a size 2 mannequin while the garment image for size 10 of the garment looks as though it was photographed on a size 10 mannequin, but both the size 2 garment image and the size 10 garment image were instead generated by digitally manipulating a single photo of one size of the garment (e.g., a size 6) on an appropriately-sized mannequin (e.g., a size 6 mannequin).

In operation, one photo (the reference photo) of one size of the garment (the reference size) is taken on a mannequin. Once the reference photo is uploaded to the virtual apparel fitting system, the system creates a set of garment images, where each garment image corresponds to a particular size of the garment. In operation, creating the set of garment images may include numerical micro adjustments (e.g., adding, removing, expanding, shrinking, or other adjustments) of pixels in the reference photo. In some embodiments, adjustment increments may be related to the reference photo and the manufacturer's grade rules. Further, the same or similar process could be following for a front view, side view, and rear view of the garment. For example, (i) a single front view reference photo of the garment could be used to create a plurality of front view garment images, where each front view garment image corresponds to a particular size of the garment, (ii) a single side view reference photo of the garment could be used to create a plurality of side view garment images, where each side view garment image corresponds to a particular size of the garment, and (iii) a single rear view reference photo of the garment could be used to create a plurality of rear view garment images, where each rear view garment image corresponds to a particular size of the garment. More, fewer, and/or different views could be used as well.

Some embodiments of the Photo Grading Sub-Process may include one or more of the following steps, not necessarily in the order shown below.

Step 1. Setting technical photo parameters, which may include setting photography parameters of camera height, depth of field and image resolution for the mannequin that is used for the creating the reference image.

Step 2. A mannequin calibration step, which may include taking a series of calibration two dimensional and/or three-dimensional photos and/or three-dimensional scans to capture mannequin dimensions and to set image scale. The calibration photos and/or scans can be taken with a cloth tape measuring wrapped around each of the head, neck, chest, waist, hip, thigh, knee, calf, ankle, triceps, bicep and wrist of the mannequin. The mannequin can be measured laterally for shoulder width, torso lengths, arm length and inseam. A contractor's tape measure or yardstick can be used to set the inch scale without rotation. Additional or alternative measurements of the mannequin's size and dimensions could be captured as well.

Step 3. Setting Fit Points, which may include setting one or more fit points (or coordinate points) on the mannequin image to establish points of adjustment on the reference image that can be manipulated to create the sized range of garment images. Some embodiments include up to 48 or more unique fit points on the mannequin image. But some embodiments may include fewer than 48 points of adjustment. In some embodiments, any combination of fit points can be used to change one size and/or shape of a garment in the reference garment image to generate another garment image for another size of the garment. For example, less than all of the fit points of a reference garment image of a size 2 of the garment may be manipulated to create a garment image for a size 2 petite, e.g., only a select few fit points relating to length, including a shorter bodice, shorter skirt length, higher arm holes for a dress, and/or other fit points based on the manufacturer's grade rules.

Step 4. A setting photo grade parameter step, which may include configuring one or more manipulation formulas that are used for changing the clothing image from one size to another (i.e., generating one or more garment images from the reference garment image). To make larger or smaller sizes, each point is manipulated to stretch or shrink the image in specific increments at one or more of the set points (or fit points). The incremental adjustments are unique to the garment and garment size and are based on the grade/size rules used by the manufacturer. In one example, if a manufacturer's size 4 pant is 2 inches larger in the waist and 2.5 inches larger in the hip than that manufacturer's size 2 pant, then the front view of the reference garment image (the garment image for the size 2 pant) can be manipulated such that one or more of the waist fit points LW1 (Left Waist-1), LW2 (Left Waist-2), RW1 (Right Waist 1), and RW2 (Right Waist-2) are stretched some number of pixels corresponding to half of the size increase (or 1 additional inch of fabric), and that the hip fit points LH1 (Left Hip-1), LH2 (Left Hip-2), RH1 (Right Hip-1), RH2 (Right Hip-2) are each stretched some number of pixels corresponding to half of the size increase (or 1.25 additional inches of fabric). The reference garment image is stretched by half of the size increase in this example because the increase in size from the size 2 to the size 4 of the pants is an increase in the total circumference of the pants at the waist and hip, respectively; however, the reference garment image only shows the front of the pants, and it is assumed that half of the increase is in the front of the pants shown in the reference garment image and half of the increase is in the back of the pants that is not shown in the reference garment image. In this way, the garment image for the size 4 pant (the garment) has more pixels than the reference garment image for the size 2 pant in a way that is proportional to how the actual size 4 pant has more fabric than the actual size 2 pant.

Step 5: Obtaining a technical photo of the mannequin wearing the reference size of the garment, which includes (i) placing the garment (the reference size of the garment in particular) on the mannequin and (ii) taking a photo (two-dimensional and/or three-dimensional) using established technical photo parameters. In operation, the size of the reference garment preferably matches the size of the mannequin. For example, a size 2 reference garment is photographed on a size 2 mannequin. Similarly, a size 6 reference garment is photographed on a size 6 mannequin.

Step 6: Photo grading, which may include clipping the technical photo of the mannequin wearing the garment (the reference size of the garment in particular). In operation, the technical photo of the mannequin wearing the reference size of the garment is edited to remove any background to obtain the reference garment image. In some embodiments, the reference garment image is rescaled so that 60 pixels in the reference garment image are equal to 1 inch of fabric in the reference size of the garment. However, the 60 pixels to 1-inch scale is arbitrary and could be set higher to achieve more detail or lower for less detail. In other embodiments, the image is rescaled so that 1 inch of fabric in the reference size of the garment is the equivalent to anywhere from 1 to 100 (or perhaps even more) pixels, such as for example 2, 3, 4, 5, 10, 12, 14, 16, 18, 20, 22, 24, 28, 32, 36, 40, 44, 48, 52, 56, 60, 64, 68, or 72 pixels, where a higher pixel-per-inch ratio provides higher resolution garment image and a lower pixel-per-inch ratio provides a lower resolution garment image. In some embodiments, the reference image may be manipulated manually with image processing software to adjust the garment image fit points based on one or more photograde parameters to create each garment image for each size of the garment. In other embodiments, one or more server components of the virtual apparel fitting system may perform the scaling/re-sizing of the reference garment image by applying one or more image processing algorithms to generate each garment image based at least in part on fit points in the reference garment image and the manufacturer's grade rules for the garment, as described in more detail herein.

Step 7: An application scale adjustment step, which may include rescaling each garment image in the set of garment images for different screen resolutions, thereby enabling the generated garment images to be viewed on screens having different screen resolutions. For example, smartphone screens typically display images having smaller resolutions (fewer number of pixels) whereas tablet, desktop, or laptop computers typically display images having higher resolutions (greater number of pixels).

Although some aspects of the description of the Photo-Grading Sub-Process are described with reference to single 2-D images, the Photo-Grading Sub-Process could also be performed with 3-D models instead of or in addition to 2-D images. For example, in further embodiments, the Photo-Grading Sub-Process includes one or more of: (i) capturing or otherwise obtaining a 3-D model of a garment on a mannequin; (ii) establishing a number of set points (e.g., fit points) in the 3-D model of the garment that are used for re-sizing the 3-D model of the garment in a virtual manner; and/or (iii) manipulating the 3-D model of the garment at one or more of the set points (or fit points) to re-size the 3-D model of the garment, where the 3-D model manipulation is based on size rules for the garment (sometimes referred to herein as garment "grade rules") as established by the manufacturer of the garment.

In embodiments configured for use with 3-D models, the output of one or more functions of the Photo-Grading Sub-Process is a set of 3-D garment models, where each 3-D garment model in the set corresponds to a particular size of the garment. For example, if a garment is available in sizes 0, 2, 4, 6, and 8, then the set of 3-D garment models includes a 3-D garment model for size 0 of the garment, a 3-D garment model for size 2 of the garment, a 3-D garment model for size 4 of the garment, a 3-D garment model for size 6 of the garment, and a 3-D garment model for size 8 of the garment. In operation, from a single "reference" 3-D garment model of the garment, a virtual apparel fitting system configured to execute one or more functions of the above-described Photo Grading Sub-Process generates a set of 3-D garment models for the garment based on one or more fit points in the reference 3-D garment model and the manufacturer's grade rules for the garment, where images of each 3-D garment model look as though they were photographed on an appropriately-sized mannequin. For example, images of the 3-D garment model for size 2 of the garment look as though they were photographed on a size 2 mannequin while images of the 3-D garment model for size 10 of the garment look as though they were photographed on a size 10 mannequin, but both the size 2 3-D garment model and the size 10 3-D garment model were instead generated by digitally manipulating a single 3-D garment model of one size of the garment (e.g., a size 6) based on an appropriately-sized mannequin (e.g., a size 6 mannequin).

In operation, one 3-D garment model (the reference 3-D garment model) of one size of the garment (the reference size) may be based on a mannequin. Once the reference 3-D garment model is uploaded to the virtual apparel fitting system, the system creates a set of garment 3-D garment models, where each 3-D garment model corresponds to a particular size of the garment. In operation, creating the set of 3-D garment models may include numerical micro adjustments (e.g., adding, removing, expanding, shrinking, or other adjustments) of voxels in the reference 3-D garment model. In some embodiments, adjustment increments may be related to the reference 3-D garment model and the manufacturer's grade rules.

User Mapped Sub-Process

Some embodiments may comprise one or more aspects of a User Mapped Sub-Process for capturing and coding a user's measurements. Typically, a user takes and uploads a full body technical photograph to the virtual apparel fitting system. For embodiments that include a smartphone application configured to take and upload the full body technical photo to a server of the virtual apparel fitting system, the smartphone application configures the smartphone camera with parameters for capturing a photograph of sufficient quality for use by the virtual apparel fitting system. Some embodiments may also include applying a mask marker to the full body photo of the user to distinguish the user's body in the photo from the background in the photo. The virtual apparel fitting system may also use the mask marker to identify at least some of the user's body dimensions from the photo.

Some embodiments where the virtual apparel fitting system uses the User Mapped Sub-Process (or variations thereon) to capture the user's body measurements may comprise one or more of: (i) obtaining a 2-D image and/or 3-D model of the user's body; (ii) applying a mask marker overlay to the 2-D image (or 3-D model) of the user's body;

(iii) adjusting points on the mask marker overlay to define where edges of the user's body are located in the 2-D image (or 3-D model); (iv) extracting coordinates from the mask marker overlay to determine fit point data for the user by determining pixel length values (or voxel dimensions) for one or more various fit points (e.g., the user's head, neck, chest, shoulder width, torso length, arm lengths, waist, hip, thighs, ankles, biceps, triceps, wrists, and/or perhaps other fit points); (v) assigning the user fit point data to a profile for the user; and/or (vi) creating a 2-D image and/or 3-D model from the image (and/or model) of the user's body and user fit point data.

Some embodiments of the User Mapped Sub-Process may include one or more the following steps, not necessarily in the order shown below.

Step 1. A registration step where the user answers questions in a registration process to identify his or her body characteristics, such as height, weight, body type, shoe size, bra size, and/or perhaps other measurements, for example.

Step 2. Using a smartphone application, a user takes a full body picture of him or herself for uploading to a server of the virtual apparel fitting system. In some embodiments, the smartphone application may provide directions for taking a good quality full body photo for use by the virtual apparel fitting system. In such embodiments, the directions can include one or more of the following:

for most accurate results, please be barefoot & wearing tight fitting clothes or bathing suit;
the smartphone should be placed on a table 30" tall;
we recommend balancing the smartphone against the back of a laptop or other device to achieve the level position indicated with the green checkmark;
once the smartphone is set up for taking the photo, press the timer & stand facing the camera of the smartphone;
stand straight with arms relaxed at your sides;
center your body with the red center line;
tips of your toes should align with the red line at bottom of the screen;
smile!

Although the example instructions listed above instruct the user to place the smartphone on a table about 30" tall, in some embodiments, the instructions for one type of smartphone may be different than the instructions for other types of smartphones to account for differences in smartphone configurations. Preferably, the instructions for how high and how to orient the smartphone are based on the position of the smartphone camera lens so that photos taken by different smartphones are taken from similar camera perspectives.

Step 3. Once the image is taken, the photo that the user just took appears with a mask marker overlay within the graphical user interface (GUI) of the smartphone application. The smartphone application directs the user to adjust the body silhouette vector mask points in the mask marker overlay to define where the edges of the body are located within the image. In some embodiments, a server component of the virtual apparel fitting system may instead perform the mask marker application to identify edges of the user's body in the photo and to distinguish the user's body in the photo from the background in the photo.

Step 4. A mask marker analysis step includes extracting coordinates from the mask marker overlay to determine pixel length values for fit points in the photo of the user, including for example, fit points for the user's head, neck, chest, shoulder width, torso lengths, arm length, waist, hip, thigh, ankle, bicep, triceps, wrist, and/or perhaps other fit points. In operation, the fit point values are stored in the user's profile, which is stored in memory of the virtual apparel fitting system, e.g., in a database associated with and/or accessible by a server component of the virtual apparel fitting system. In some embodiments, the virtual apparel fitting system (e.g., a server of the system) may additionally analyze the fit point data in the user image to generate user-specific datasets for use in other aspects of some embodiments disclosed and described herein.

Some embodiments may alternatively include the user providing both (i) a calibration photo comprising a background, and (ii) a photo comprising the user standing in front of the background in the calibration photo. The server system can then extract an image of user from the photo of the user standing in front of the background by comparing the calibration photo with the photo of the user standing in front of the background.

Figure 10:
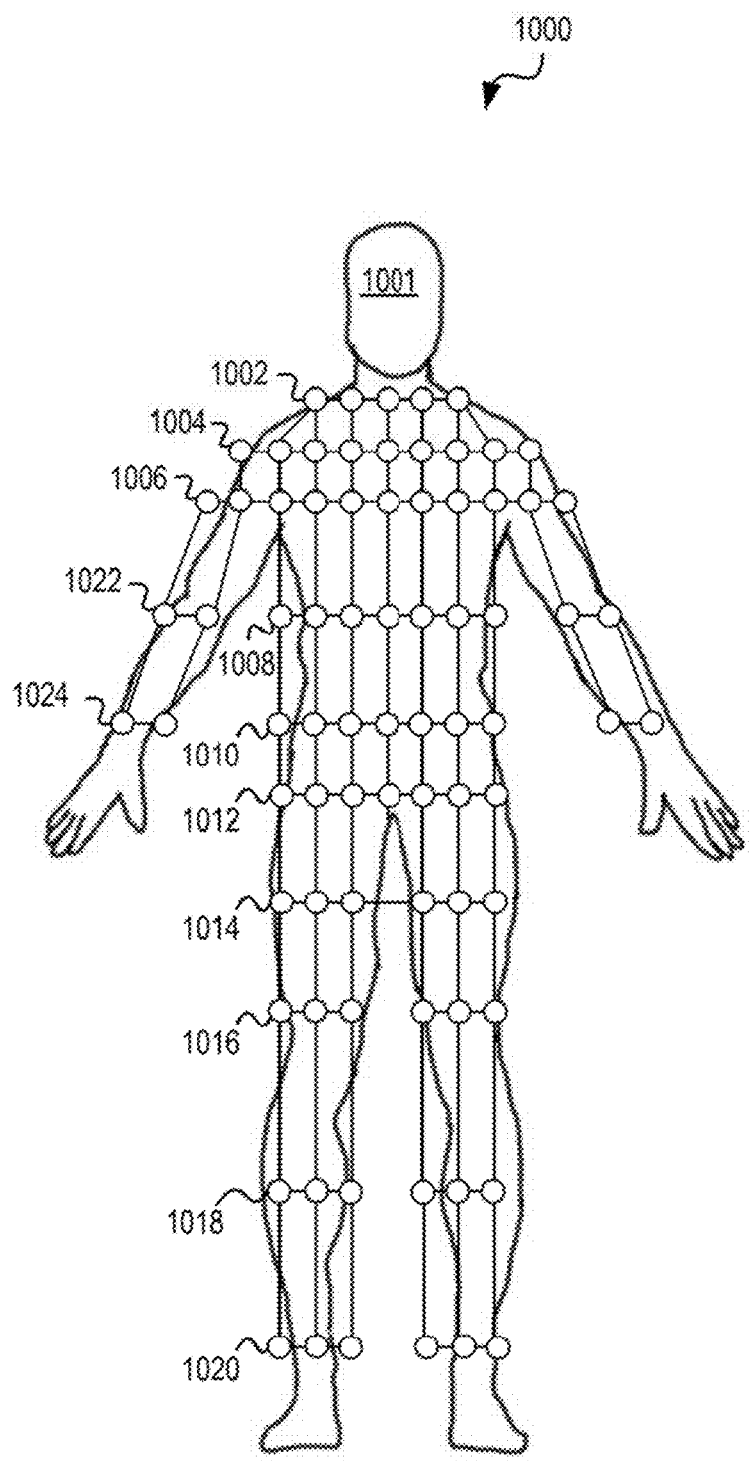
FIG. 10 is a diagram showing fit points in a user image for use with some aspects of the disclosed embodiments.

Step 5: Generating one or both of a 2-D user image and/or 3-D user model comprising the user fit points. One example of a 2-D user image comprising user fit points is shown in FIG. 10, which shows a diagram with fit points 1002-1024 in a user image 1000 of a user 1001 for use with some aspects of the disclosed embodiments, as described in further detail herein.

Fit Point Alignment Sub-Process

Some embodiments may also include a Fit Point Alignment Sub-Process which includes aligning user fit points in a user image (e.g., a user image created via the above-described User-Mapped Sub Process) to mannequin fit points in a mannequin image so that one or more garment fit points in a garment image (e.g., a garment image created via the above-described Photo Grading Process) can be aligned with one or more corresponding user fit points in the user image for generating an image of the user wearing the garment (or a particular size of the garment).

In some embodiments, the Fit Point Alignment Sub-Process includes aligning body landmarks of an image of the user's body (user fit points in the user image) with body landmarks of an image of a mannequin (mannequin fit points in a mannequin image) via one or more of the following steps: (i) setting coordinate points on a mannequin image to establish the location of the mannequin fit points; (ii) receiving a 2-D image of a user's body; (iii) applying a mask marker overlay to the image of the user's body; (iv) adjusting points on the mask marker overlay to define where edges of the user's body are located in the image of the user's body; (v) determining the user's fit points based on vector points of the mask marker overlay; and (vi) shifting the user's fit points to align with the mannequin's fit points.

In some embodiments, the Fit Point Alignment Sub-Process additionally or alternatively aligns the user's fit points in the user image with the mannequin's posture alignment and the mannequin's fit points in the mannequin image. The Fit Point Alignment Sub-Process enables garment images to be placed on the user image so that both are aligned, or at least improves the virtual apparel fitting system's ability to align one or more garment fit points in a garment image with one or more corresponding user fit points in a user image.

Some embodiments of the Fit Point Alignment Sub-Process may include one or more the following steps, not necessarily in the order shown below.

Step 1. A Technical Mannequin Posture Position step includes setting coordinate points on a mannequin image to establish the location of body landmarks (i.e., mannequin fit points) on the mannequin image, including for example, top of head, center of neck, edges of shoulders, elbow, wrist, chest, waist, hips, center of crotch, knee, ankle, toes, and/or perhaps other mannequin fit points.

Step 2. A User Posture Mask Marker step includes using a mask marker to define the edges of the user's body in a photograph of the user's body and to identify the edges of the user's body and to distinguish between the user's body in the photo and the background in the photo. Some embodiments may additionally or alternatively include comparing a first photo including a background image (a calibration photo) with a second photo of the user standing in front of the background image in the first photo to extract an image of the user from the second photo.

Step 3. A User Posture Position step includes determining one or more user fit points in the user image based on one or more mask marker vector points.

Step 4. A Fit Point Alignment Image Adjustment step includes adjusting the user image within a set tolerance to shift the user fit points in the user image to align with the mannequin fit points in the mannequin image. In some embodiments, the Fit Point Alignment Image Adjustment includes manually aligning the user fit points in the user image with corresponding mannequin fit points in the mannequin image via image processing software. In other embodiments, the virtual apparel fitting system (or perhaps a server component of the virtual apparel fitting system) may be configured to automatically align user fit points in the user image with mannequin fit points in the mannequin image.

Although the Fit Point Alignment Sub Process is described with reference to 2-D images of the user and a mannequin, the Fit Point Alignment Sub Process could additionally or alternatively be implemented with 3-D models of the user and the mannequin. For example, in such embodiments, the Fit Point Alignment Sub-Process includes aligning body landmarks of a 3-D body model of the user's body (user fit points in the 3-D body model) with body landmarks of a 3-D body model of a mannequin (mannequin fit points in a 3-D mannequin model) via one or more of the following steps: (i) setting coordinate points on a 3-D mannequin body model to establish the location of the mannequin fit points; (ii) receiving a 3-D user body model of a user's body; (iii) applying a mask marker overlay to the 3-D body model of the user's body; (iv) adjusting points on the mask marker overlay to define where edges of the user's body are located in the 3-D body model of the user's body; (v) determining the user's fit points based on vector points of the mask marker overlay; and (vi) shifting the user's fit points to align with the mannequin's fit points.

Style Patterned Sub-Process

Some embodiments may also include a Style Patterned Sub-Process that includes determining an individual garment's key measurement points. The "key measurement points" are the measurement points of the garment that are most important for determining whether and/or the extent to which the garment (or at least a particular size of the garment) will fit a particular user.

In some embodiments, the Style Patterned Sub-Process includes: (i) storing data corresponding to garment measurement points from the garment manufacturer's specifications and perhaps other garment data such as fabric type and/or drape characteristics; (ii) storing a weighting factor for one or more garment key measurement points, wherein individual weighting factors are expressed as a percentage and together total 100%; and (iii) comparing how a user's measurements predicted from an analysis of a user image (and/or perhaps from the user's actual body measurements from information from the user's profile) compares to the garment manufacturer's fit model for the garment in a selected size, and expressing the comparison as a fit index of a value from 0 to 10 (or perhaps some other range, e.g., 1 to 5, 1 to 100, or some other range of values). In operation, garment data from the garment manufacturer's garment specifications, user measurement points (and perhaps other user information) are compared with garment key measurement points and qualitative and quantitative data about the garment fabric and other characteristics that affect fit and wear ability.

Some embodiments of the Style Patterned Sub-Process may include one or more the following steps, not necessarily in the order shown below.

Step 1. A garment dimensions collection step includes receiving and storing data corresponding to key measurement points for a particular garment (and perhaps size of garment) from the garment manufacturer's garment specification for that particular garment. The key measurement points may include one or more measurement points selected from the shoulder width, top torso length, bottom torso length, rise, inseam, arm length, neck, chest, waist, hip, thigh, triceps, bicep, wrist, high point shoulder to hem, waist to hem, and/or other fit points. In operation, different garments may have different key measurement points.

Step 2. A Garment/Fabric Dynamic Characteristics collection step includes receiving and storing characteristics about the garment, including but not limited to the garment's fabric structure (knit/woven/felt), the fabric stretch type and percentage, adjustable garment features like draw string closures, fabric weight, fabric stiffness, fabric grain (as it relates to drape and stretch), and/or whether the garment is intended for layered wearing (for example, a tee shirt might be worn close to the skin whereas a coat is worn over layers). Other garment/fabric characteristics about a particular garment could be stored as well.

Step 4. A Fit Model Relational Size step includes identifying the garment manufacturer's "ideal fit" for the garment manufacturer's fit model. The manufacturer's fit model corresponds to the body measurements for which the manufacturer designed the garment. In operation, different manufacturers have different fit models; some manufacturers may have different fit models for different garments. For example, a manufacturer's fit model for a "slim fit" garment might be different than the manufacturer's model for a "big and tall" garment. Some embodiments may also include determining a percentage or other measure of fabric ease at key measurement points of the garment in relation to the manufacturer's fit model. If a fit model for a particular manufacturer or particular garment is not available, the fit model can be estimated based on the median values of the manufacturer's size chart for the garment.

Step 3. A Weighting Factor setting step includes storing a weighting factor for one or more key measurement points for the garment. The weighting factor for a particular key measurement point for a garment may be based on one or more of the garment drape, fabric type, stretch parameters, etc. and the dimensions of the manufacturer's fit model for that garment. The weighting factor for a key measurement point is set at a percentage value, where the higher the percentage value, the more critical it is that the garment fit the user within the recommended measurement range for that key measurement point. In some embodiments, the sum of the weighting factors for each of the key fit points of the garment must add up to 100%.

Step 4. A Fit Index step includes calculating a fit index for a particular size of a particular garment that quantifies at least in part how well the user's measurements match the garment manufacturer's fit model for that particular size of that particular garment based at least in part on how well the key measurement points for that particular size of that particular garment align with corresponding user measurements points on the user's body, and/or perhaps a difference between (i) a value of a measurement point of the user and (ii) a value of a corresponding measurement point of a fit model for that size of the garment. In operation, the more closely that the user's body measurements match the garment manufacturer's fit model for that garment, the better the garment is likely to fit the user.

Step 5. A Style Pattern Fit Estimate step includes estimating how well a particular manufacturer's garment and/or garment style would fit the user based on one or more of (i) the user's Fit Index relative to the manufacturer's fit model, and/or (ii) how well key measurement points in the garment align with corresponding user measurement points (and/or perhaps a difference between a value of a measurement point of the user and a value of a corresponding measurement point of a fit model for that size of the garment).

Preference Driven Sub-Process

Some embodiments may also include a Preference Driven Sub-Process to accommodate user preferences for fit, e.g., if a particular user prefers a looser-than-standard fit, a tighter-than-standard fit, a longer-than-standard fit, a shorter-than-standard fit, and/or perhaps other user preferred deviations from a standard fit.

In some embodiments, the Preference Driven Sub-Process accounts for user garment fit preferences and includes one or more of the following steps: (i) creating a user body model; (ii) creating a user's ideal fit model based on user preferences regarding how loose or tight the user prefers clothes to fit at one or more fit points; (iii) optionally refining the user's ideal fit model based on user feedback from items purchased; (iv) for a particular garment, determining a weighting factor for one or more key measurement points of the garment based on the user's fit preferences, wherein each weighting factor is expressed as a percentage and where all of the weighting factors together total 100%; and (v) generating a fit index for a garment based on one or more of the user's body model, the user's ideal fit model, and the weighting factors for the key measurement points of the garment.

In some embodiments, the Preference Driven Sub-Process includes (i) creating a custom fit profile for the user for a particular size of a particular garment based at least in part on a combination of data from the User Mapped Sub-Process and the Style Pattern Sub-Process and (ii) optionally revising the user's custom fit profile based on learned or specified user preferences.

Body Mirroring Avatars

Some embodiments include mapping one or more user images (e.g., one or more of 2-D images or perhaps a 360° image) onto a body mirroring avatar that mirrors the user's body shape and dimension, weight, and/or height. Some embodiments may alternatively use body mirroring avatars without mapping user images onto avatars.

Raster Mapped 3-D Apparel Sub-Process

Some embodiments may further include a Raster Mapped 3-D Apparel Sub-Process that includes mapping 2-D garment images and/or 2-D user images onto 3-D wire frames to create 3-D models of the user wearing garments.

In some embodiments, the Raster Mapped 3-D Apparel Sub-Process includes one or more of: (i) receiving a 360° raster image of a reference garment displayed on a mannequin; (ii) receiving a 3-D scan of the reference garment on the mannequin and creating a 3-D model image of the exterior of the garment displayed on the mannequin based on the 3-D scan; (iii) aligning the 3-D model image with the 360° raster image and draping the raster image over the 3-D model image to create a 3-D garment image; (iv) combining a 3-D user model with the 3-D garment model to generate a 3-D model of the user wearing the garment; and/or (v) optionally modifying the 3-D model of user wearing the garment based on user and/or garment manufacturer preferences. In some embodiments, the Raster Mapped 3-D Apparel Sub-Process could be used in combination with one or more of the other sub-processes and/or other features and functions disclosed and described herein.

DETAILED DESCRIPTION OF THE FIGURES

FIG. 1 is a screen shot of a Graphical User Interface (GUI) showing an example user registration screen 100 according to some embodiments.

Registration screen 100 enables a new user to register with the virtual apparel fitting system. To register with the virtual apparel fitting system, a user enters an email address into field 102, enters a password into password field 104, enters the password again into the confirm password field 106, enters a zipcode into zipcode field 108, indicates a gender via gender selection field 110, and activates the register button 112 within the registration screen 100. After registering with the virtual apparel fitting system, the user may thereafter provide additional information to the virtual apparel fitting system as described herein. Some embodiments may include additional or fewer fields in a registration screen. For example, some embodiments may not include zipcode field 108. Similarly, some embodiments may include fields for the user's name and mailing address for example.

Figure 2:
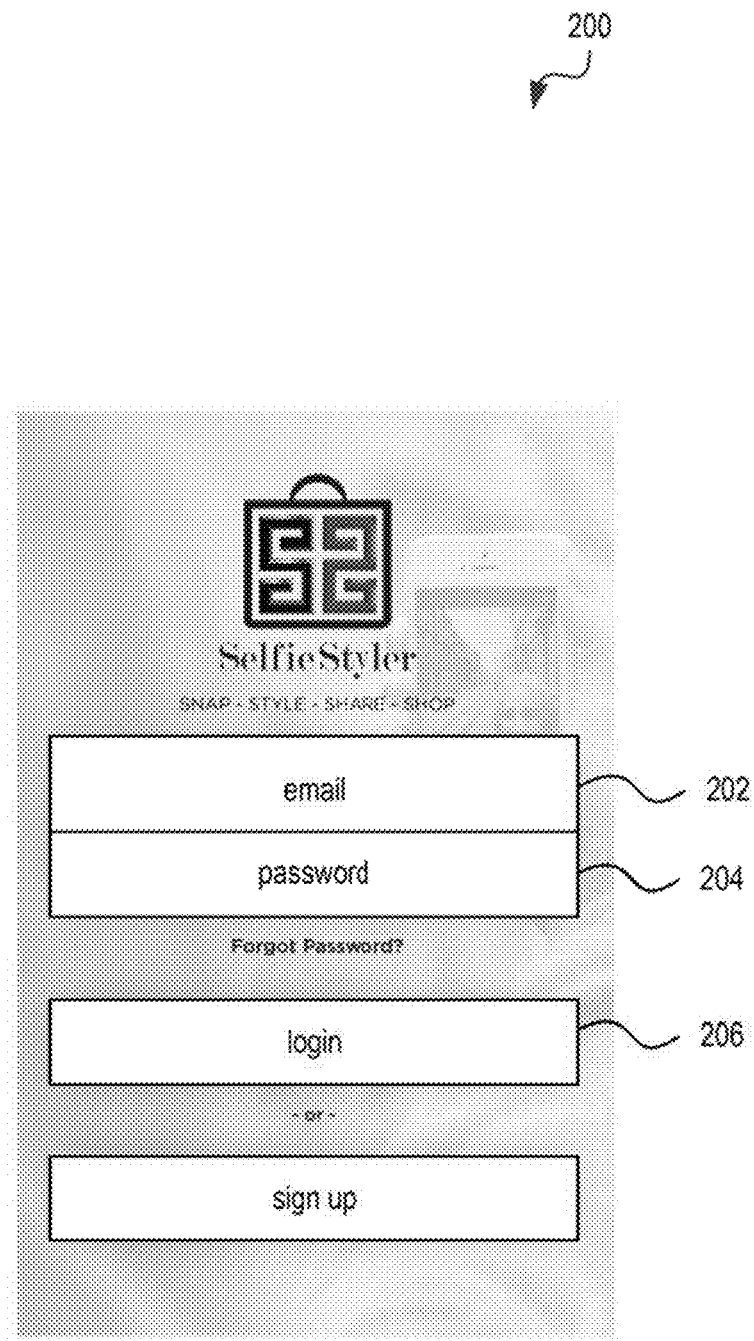
FIG. 2 is a screen shot of a GUI showing an example login screen according to some embodiments.

FIG. 2 is a screen shot of a GUI showing an example login screen 200 according to some embodiments. Once a user has registered with the virtual apparel fitting system, the user may login to the virtual apparel fitting system via login screen 200 by entering the user's registered email into email field 202, entering the user's password into the password field 204, and activating the login button 206. Some embodiments may include additional or fewer fields in a login screen.

Figure 3:
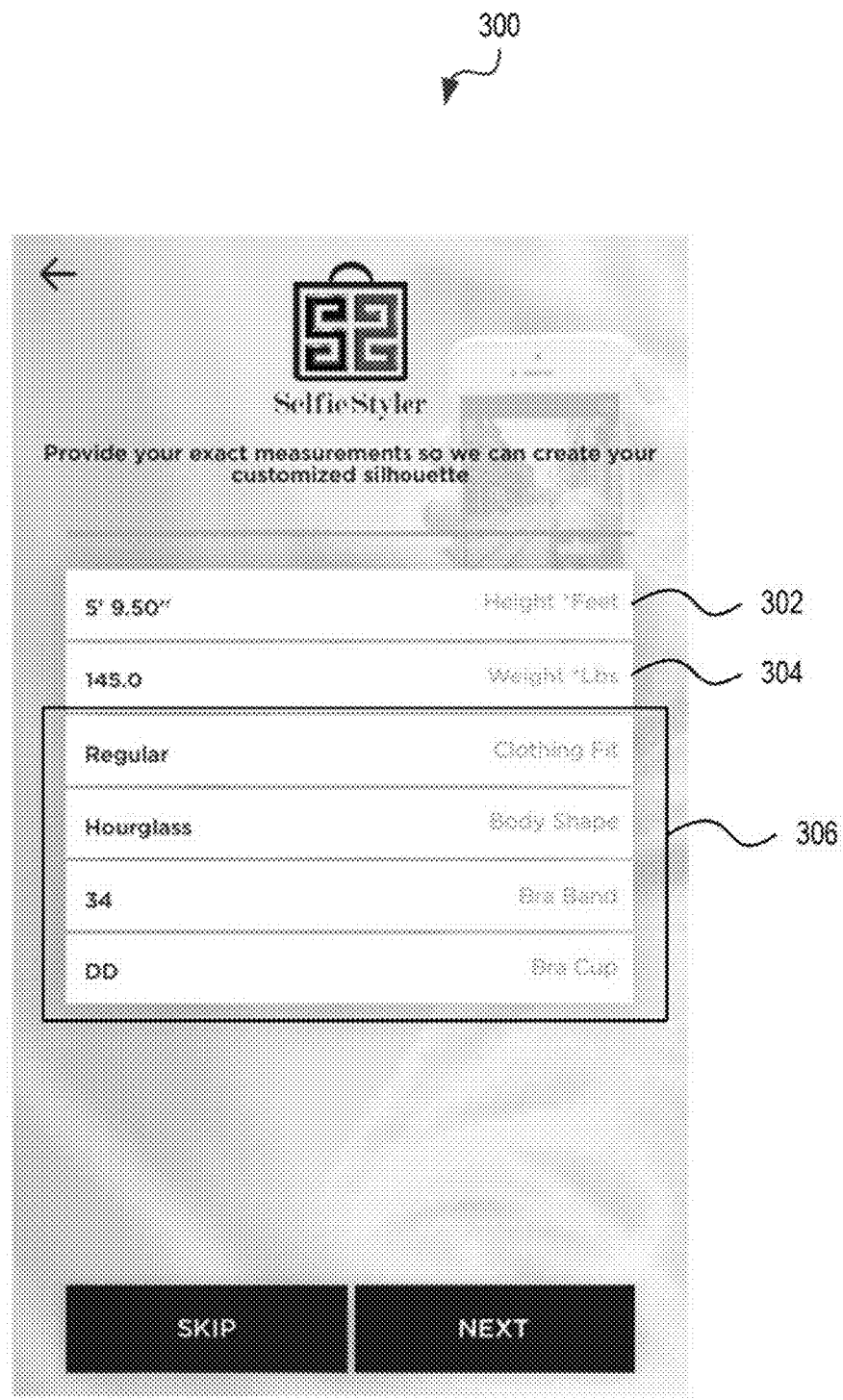
FIG. 3 is a screen shot of a GUI showing an example input screen for capturing body characteristics and sizes according to some embodiments.

FIG. 3 is a screen shot of a GUI showing an example input screen 300 for capturing body characteristics, measurements, and sizes from a user according to some embodiments. After registering with the virtual apparel fitting system (FIG. 1) and/or logging in to the virtual apparel fitting system (FIG. 2), the user provides his or her body characteristics and/or measurements to the virtual apparel fitting system via input screen 300 by entering his or her height into height field 302, entering his or her weight into weight field 304, and entering other body characteristics, measurements, and/or size information into other body measurement fields 306. Some embodiments may include additional or fewer fields for capturing body characteristics, measurements, and sizes. For example, in some embodiments, input screen 300 may additionally or alternatively include information on the user's dress size, coat size, shirt size, pant size, and/or other sizing information and/or body measurements.

Figure 4:
FIG. 4 is a screen shot of a GUI showing an example screen for a user to upload a photo of him or herself according to some embodiments.

FIG. 4 is a screen shot of a GUI showing an example screen 400 for a user to upload a photo of him or herself according some embodiments. In operation, the user activates button 402 to take a digital image (or perhaps to select a previously taken digital image) of the user for uploading to the virtual apparel fitting system. Some embodiments may use different mechanisms to launch a camera application to take a new digital image or to enable the user to upload a digital image of the user to the virtual apparel fitting system.

Figure 5:
FIG. 5 is a screen shot of a GUI showing an example shopping page according to some embodiments.

FIG. 5 is a screen shot of a GUI showing an example shopping page 500 according some embodiments. Shopping page 500 includes a set 502 of garments that a user can select to try on via the virtual apparel fitting system. In some embodiments, the shopping page 500 may display larger or smaller sets of garments on a single page.

Figure 6:
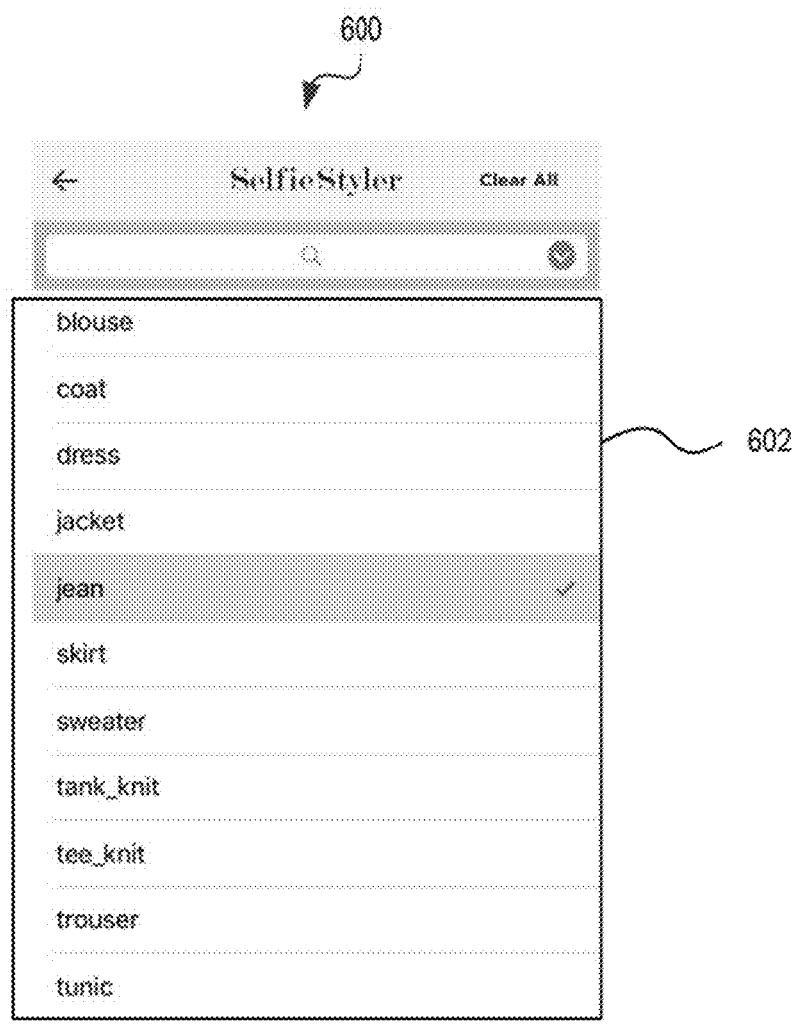
FIG. 6 is a screen shot of a GUI showing an example shopping page with a drop-down menu listing choices for shopping by style according to some embodiments.

FIG. 6 is a screen shot of a GUI showing an example shopping page 600 with a menu 602 listing choices for shopping by style according to some embodiments. Example shopping page 600 shows a menu 602 comprising different styles of clothes. Some embodiments may include menus that comprise more or fewer styles of clothes than the styles shown in drop-down menu 602.

Figure 7:
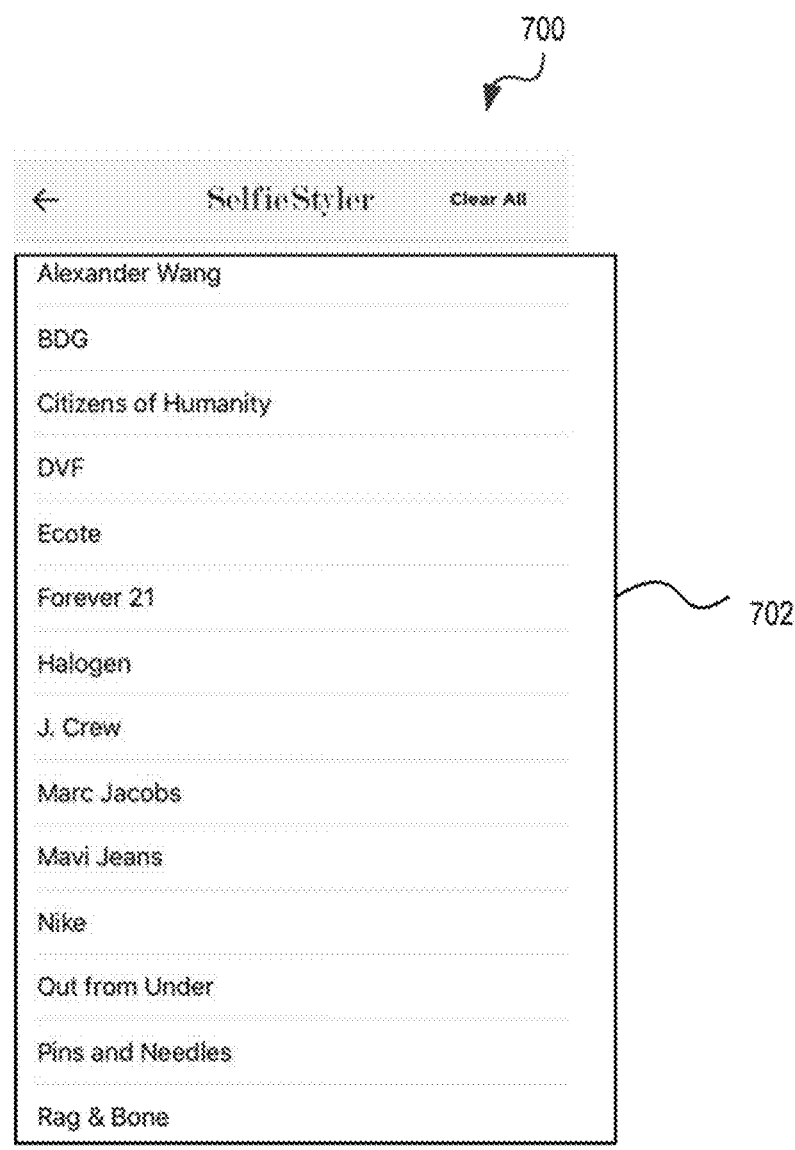
FIG. 7 is a screen shot of a GUI showing an example shopping page with a drop-down menu listing choices for shopping by brand according to some embodiments.

FIG. 7 is a screen shot of a GUI showing an example shopping page 700 with a menu 702 listing choices for shopping by brand according some embodiments. Example shopping page 700 shows a menu 702 comprising different brands. Some embodiments may include menus that comprise more or fewer brands than the brands shown in menu 702.

Figure 8:
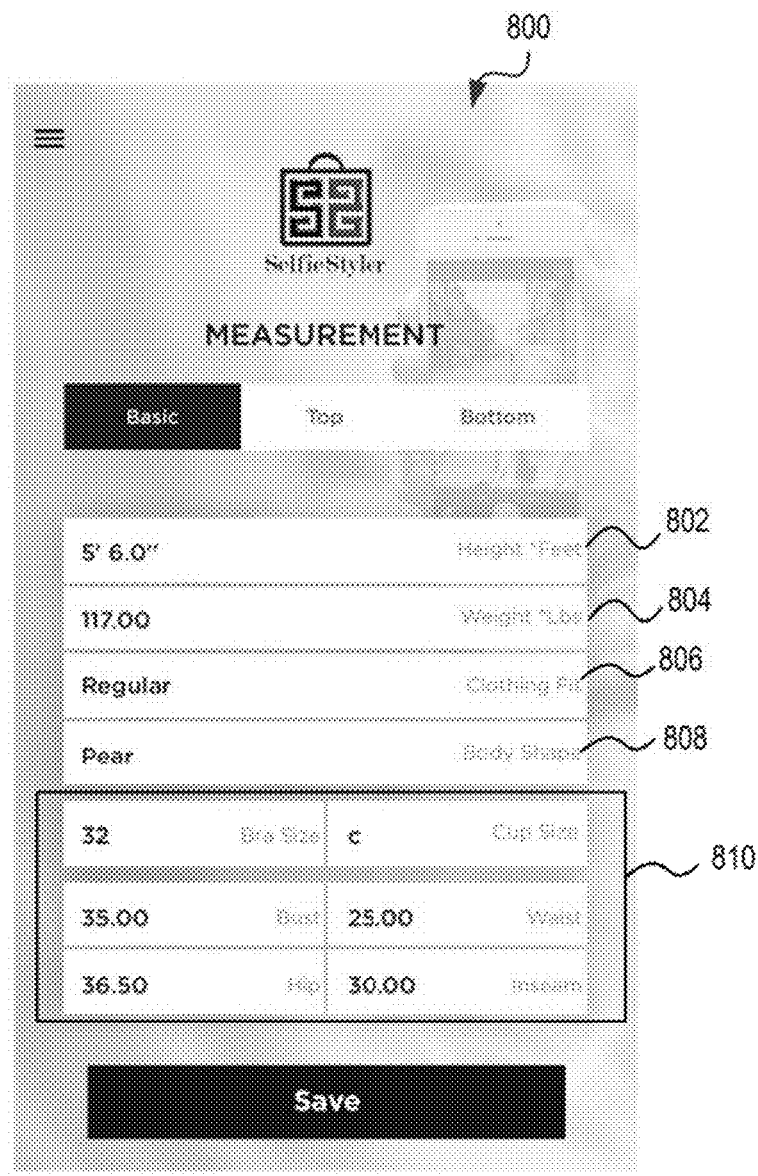
FIG. 8 is a screen shot of a GUI showing an example user profile screen that has specific measurements of the user according to some embodiments.

FIG. 8 is a screen shot of a GUI showing an example user profile screen 800 that shows specific measurements of the user according to some embodiments. Example user profile screen 800 includes body and measurement information for the user, including the user's height in field 802, the user's weight in field 804, the user's preferred clothing fit in field 806, and the user's body shape 808, along with other measurements in one or more additional fields 810. Some embodiments may have more or fewer body and measurement information than the body and measurement information shown in example user profile screen 800. For example, some embodiments may additionally or alternatively include the user's dress size, the user's inseam, the user's bust size, and/or perhaps other body and/or measurement information.

Figure 9:
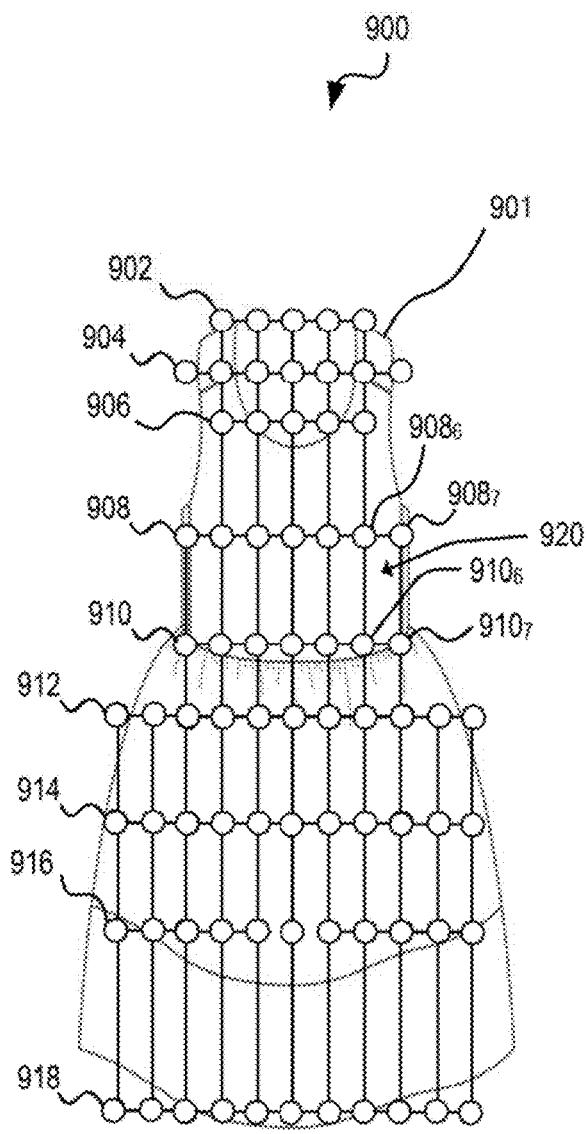
FIG. 9 is a diagram showing fit points in a garment image for use with some aspects of the disclosed embodiments.

FIG. 9 is a diagram showing fit points 902-918 in a garment image 900 of one size of a garment 901 for use with some aspects of the disclosed embodiments.

In some embodiments, the virtual apparel fitting system uses the above-described Photo-Grading Sub-Process (and/or variations thereof) to generate a plurality of garment images for a garment based on a single digital image of the garment, wherein each garment image corresponds to a different size of the garment. The plurality of garment images may include two-dimensional garment images and/or images of three-dimensional garment models, as described previously. Additionally, while the garment image 900 shows only the front of dress 901, additional garment images may show the side(s) and/or back of dress 901. In some embodiments, a server component of the virtual apparel fitting system generates the plurality of garment images for a particular garment.

For example, a typical garment such as dress 901 shown in FIG. 9 is available in a range of sizes, such as sizes 0, 2, 4, 6, 8, 10, 12, and perhaps other smaller or larger sizes. Some garments may also have additional designations, such as petite, tall, long, short, maternity or other additional designations. For example, in addition to sizes 0-12, the dress shown in FIG. 9 may also be available in 0-Petite, 2-Petite, and 4-Petite and perhaps other sizes with additional designations.

In some embodiments, the virtual apparel fitting system generates (or perhaps receives) a garment image of a "reference" (or standard) size for a garment. In some embodiments, the virtual apparel fitting system uses the garment image for the reference size of the garment as a "reference garment image." In practice, generating the reference garment image includes (i) receiving a digital image of a mannequin wearing the "reference" size of the garment and (ii) removing the mannequin from the digital image, e.g., via a mask. The virtual apparel fitting system then uses the reference garment image to generate a garment image for each size of the garment based on a set of "fit points" for the garment and a set of "grade rules" for the garment.

A garment's grade rules are typically available from the manufacturer but could alternatively be obtained by physically measuring different sizes of the garment or determined from reference pattern grading text books or perhaps other sources. The grade rules describe the measurements of each size of the garment at a set of "fit points" for the garment. The fit points for example dress 901 in FIG. 9 include set of five neck fit points 902, a set of seven shoulder fit points 904, a set of five upper chest fit points 906, a set of seven mid-chest fit points 908, a set of seven waist fit points 910, a set of eleven hip fit points 912, a set of eleven thigh fit points 914, a set of eleven knee fit points 916, and a set of eleven calf fit points 918. Other garments may have more or fewer fit points arranged in the same or different areas. For example, a garment with sleeves (e.g., a shirt or blouse) may have multiple fit points along the sleeve, e.g., bicep, elbow, forearm, and so on. Similarly, a shirt or blouse may not have fit points for the thigh, knee, or calf.

In operation, the virtual apparel fitting system preferably uses the garment's "grade rules" obtained from the manufacturer to make smaller and/or larger garment images for smaller or larger sized versions of the garment based on the garment fit points. Making smaller and/or larger garment images from the "reference" garment image is sometimes referred to herein as "scaling" the "reference" garment image to the larger or smaller garment images. To use the example dress shown in FIG. 9, if the "reference garment image" is an image of a size 6 of dress 901, then the virtual apparel fitting system can use the manufacturer's grade rules and the fit points for dress 901 to convert the "reference garment image" of the size 6 of the dress 901 to a scaled image of any other size of the dress 901.

Mid-chest fit points $908_6$ and $908_7$ and waist fit points $910_6$ and $910_7$ illustrate one way that the virtual apparel fitting system uses the manufacturer grade rules and the fit points for dress 901 to generate scaled garment images for larger or smaller sizes of the dress 901 relative to the "reference garment image" of the size 6 of the dress 901. The manufacturer's grade rules for the dress 901 define, for every available size of the dress 901: (i) the distance between fit point $908_6$ and fit point $908_7$, (ii) the distance between fit point $908_7$ and fit point $910_7$, (iii) the distance between fit point $910_7$ and fit point $910_6$, and (iv) the distance between fit point $910_6$ and $908_6$. These four distance measurements define an area 920 bounded by fit points $908_6$, $908_7$, $910_7$, and $908_6$. The distances between fit points $908_6$, $908_7$, $910_7$, and $908_6$ are greater for larger sizes of the dress 901 and smaller for smaller sizes of the dress 901. Similarly, the corresponding area bounded by fit points $908_6$, $908_7$, $910_7$, and $908_6$ is greater for larger sizes of the dress 901 and smaller for smaller sizes of the dress 901.

Using the "reference garment image" 900 of the size 6 "reference size" of dress 901, the fit points of the dress 901, and the manufacturer's grade rules for the dress 901, the virtual apparel fitting system determines a relationship between (i) a number of pixels between fit points $908_6$, $908_7$, $910_7$, and $908_6$ (and perhaps also a number of pixels in area 920 bounded by fit points $908_6$, $908_7$, $910_7$, and $908_6$ of dress 901) in the "reference garment image" 900 of the reference size 6 of the dress 901 and (ii) an amount of actual fabric between fit points 908$_6$, 908$_7$, 910$_7$, and 908$_6$ for the reference size 6 of the dress 901 (and perhaps also within area 920 bounded by fit points 908$_6$, 908$_7$, 910$_7$, and 908$_6$ of dress 901) according to the grade rules. After determining the relationship between the pixels in the reference garment image of the size 6 dress and the amount of fabric in the actual size 6 of the dress (based on the garment's grade rules), the virtual apparel fitting system can use that pixel-to-inch relationship to scale the "reference garment image" 900 up in size for larger sizes of the dress 901 (e.g., sizes 8, 10, 12, and so on) and/or scale the "reference garment image" 900 down in size for smaller sizes of the dress 901 (e.g., sizes 4, 2, 0, and so on).

As a simplified illustrative example, assume that the grade rules for the dress 901 state that, for a size 6 of the dress 901: (i) the distance between fit point 908$_6$ and fit point 908$_7$ is one inch, (ii) the distance between fit point 908$_7$ and fit point 910$_7$ is three inches, (iii) the distance between fit point 910$_7$ and fit point 910$_6$ is one inch and (iv) the distance between fit point 910$_6$ and 908$_6$ is three inches. In such an example, the area 920 bounded by fit points 908$_6$, 908$_7$, 910$_7$, and 908$_6$ in the size 6 of the dress 901 is three square inches.

Additionally, assume that an imaging analysis of the "reference garment image" 900 for the reference size 6 of the dress 901 shows (i) the distance between fit point 908$_6$ and fit point 908$_7$ is 100 pixels, (ii) the distance between fit point 908$_7$ and fit point 910$_7$ is 300 pixels, (iii) the distance between fit point 910$_7$ and fit point 910$_6$ is 100 pixels and (iv) the distance between fit point 910$_6$ and 908$_6$ is 300 pixels. In such an example, the area 920 bounded by fit points 908$_6$, 908$_7$, 910$_7$, and 908$_6$ in the reference garment image 900 of the dress 901 includes 30,000 pixels.

In this simplified illustrative example, the relationship between the amount of fabric in the reference size 6 of the dress 901 and the number of pixels in the reference garment image 900 of the size 6 of the dress 901 is 100 pixels to 1 inch (and 10,000 pixels per square inch). Of course in practice, an actual fabric-to-pixel ratio may be more or less than 100 pixels to 1 inch. Once the virtual apparel fitting system has determined the relationship between fabric to pixels with respect to the reference garment image, the virtual apparel fitting system can use this relationship to generate a separate garment image for size of the garment.

For example, further assume that the grade rules for the dress 901 further state that, for a size 8 of the dress 901: (i) the distance between fit point 908$_6$ and fit point 908$_7$ is 1.5 inches, (ii) the distance between fit point 908$_7$ and fit point 910$_7$ is 3.5 inches, (iii) the distance between fit point 910$_7$ and fit point 910$_6$ is 1.5 inches and (iv) the distance between fit point 910$_6$ and 908$_6$ is 3.5 inches. In such an example, the area 920 bounded by fit points 908$_6$, 908$_7$, 910$_7$, and 908$_6$ in the size 8 of the dress 901 is 5.25 square inches. Using the 100 pixels to 1 inch relationship determined above, the virtual apparel fitting system can generate a garment image for the size 8 of the dress 901 where: (i) the distance between fit point 908$_6$ and fit point 908$_7$ is 150 pixels, (ii) the distance between fit point 908$_7$ and fit point 910$_7$ is 350 pixels, (iii) the distance between fit point 910$_7$ and fit point 910$_6$ is 150 pixels and (iv) the distance between fit point 910$_6$ and 908$_6$ is 350 pixels. In such an example, the area 920 bounded by fit points 908$_6$, 908$_7$, 910$_7$, and 908$_6$ in the size 8 of the dress 901 is 52,500 pixels. In this manner, the generated garment image for a size 8 of the dress 901 has more pixels than the reference garment image 900 (size 6) in a manner proportional to how an actual size 8 of the dress 901 has more fabric than an actual size 6 of the dress 901.

In some embodiments, the virtual apparel fitting system may determine the fabric to pixel ratio/relationship in one area and then apply that ratio to the entire image in a manner similar to that described above in the simplified illustrative example. In other embodiments, the virtual apparel fitting system may determine a fabric to pixel ratio between each adjacent fit point pair (e.g., 908$_6$ to 908$_7$ is one adjacent fit point pair, 908$_7$ to 910$_7$ is another adjacent fit point pair, and so on) and apply the determined fabric to pixel ratio between adjacent fit point pairs on a fit point pair by fit point pair basis when generating the garment image for a particular size of the garment.

In still further embodiments, the virtual apparel fitting system may divide the reference garment image into a plurality of "tiles" where an individual tile corresponds to an area bounded by a set of fit points. For example, area 920 bounded by fit points 908$_6$, 908$_7$, 910$_7$, and 908$_6$ may be considered one tile. The virtual apparel fitting system can use the determined fabric to pixel ratio to scale the size of individual tiles in the reference garment image up or down according to a determined ratio between fabric and pixels. In some embodiments, the virtual apparel fitting system may determine a single fabric-to-pixel ratio and apply that single fabric-to-pixel ratio to the entire reference garment image according to the garment's grade rules to generate a garment image for each available size of the garment. In other embodiments, the virtual apparel fitting system may determine a fabric-to-pixel ratio for each tile on a tile-by-tile basis, and then apply each tile's corresponding fabric-to-pixel ratio to that tile according to the grade rules to generate different garment images for different sizes of the garment. Still further embodiments may include various combinations of the above-described methods (e.g., fit-point pair by fit-point pair, tile-by-tile, etc.) to generate a plurality of garment images for a garment based on a single digital image of the garment, wherein each garment image corresponds to a different size of the garment.

Those of skill art will understand that the fit points 902-918 are shown in FIG. 9 for illustration purposes only and need not be explicitly shown (and preferably are not explicitly shown) in the reference garment image for a garment or in any of the generated garment images for the different sizes of the garment.

As mentioned previously, in some embodiments, the virtual apparel fitting system additionally or alternatively generates a plurality of three-dimensional garment models, where each three-dimensional garment model corresponds to a particular size of the garment. The procedure for generating three-dimensional garment models is similar to the procedure for generating two-dimensional garment images described herein. For example, in some embodiments, the virtual apparel fitting system (i) receives a three-dimensional model of a mannequin wearing a reference size of the garment and (ii) generates a three-dimensional garment model for the reference size of the garment by removing the mannequin from the three-dimensional model of the mannequin wearing the reference size of the garment, wherein the three-dimensional reference model comprises a plurality of reference model regions. The virtual apparel fitting system may then use fit points in the three-dimensional reference model and the manufacturer's grade rules for the garment to determine one or more voxel-to-fabric ratios that can be used to generate three-dimensional garment models for any size of the garment in a manner similar to that described herein with reference to creating two-dimensional garment images. The virtual apparel fitting system may be further configured to generate images of the three-dimensional models for display to a user via a GUI as described herein.

FIG. 10 is a diagram showing fit points 1002-1024 in a user image 1000 of a user 1001 for use with some aspects of the disclosed embodiments.

In some embodiments, a user provides the virtual apparel fitting system with a digital photograph of him or herself, e.g., by taking a digital photograph and then uploading the photograph to the virtual apparel fitting system via screen 400 (FIG. 4). The virtual apparel fitting system may obtain a digital photograph of a user through alternative methods as well.

Some embodiments may additionally include applying a mask marker to the digital photograph of the user to determine the edges of the user's body in the digital photograph to obtain a user image. Alternatively, some embodiments may obtain a user image by (i) receiving (from the user) a calibration photo, where the calibration image includes a background, (ii) receiving (from the user) a photo of the user standing against the background, and (iii) extracting an image of the user from the photo of the user standing against the background by comparing the photo of the user standing against the background with the calibration photo of the background. In some embodiments, the virtual apparel fitting system can use the edges of the user's body in the user image to determine pixel length values between prospective user fit points in the user image in connection with (i) generating the user image 1000 comprising user fit points 1002-1020 and/or (ii) analyzing the user image 1000 in connection with aligning fit points in a garment image (for a particular size of the garment) with user fit points 1002-1024 in the user image 1000.

After receiving the digital photograph of the user, the virtual apparel fitting system may use one or more aspects of the above-described User Mapped Sub-Process (and/or variations thereof) and/or the above-described Preference Driven Sub-Process (and/or variations thereof) to generate the user image 1000 of the user 1001.

The user image 1000 of the user 1001 includes a plurality of fit points 1002-1024. The fit points for the example user image 1000 in FIG. 10 include set of five neck fit points 1002, a set of nine shoulder fit points 1004, a set of nine upper chest fit points 1006, a set of seven mid-chest fit points 1008, a set of seven waist fit points 1010, a set of seven hip fit points 1012, a set of six thigh fit points 1014, a set of six knee fit points 1016, a set of six calf fit points 1018, a set of six ankle fit points 1020, a set of two elbow fit points, and a set of four wrist fit points 1024. Other user images may have more or fewer fit points arranged in the same or different areas.

In some embodiments, after receiving the digital photograph of the user, the virtual apparel fitting system (i) determines prospective user fit points (not shown) for the user 1001 in the digital photograph; (ii) aligns the prospective user fit points (not shown) with technical mannequin fit points (not shown) in an image of a technical mannequin (not shown); and (iii) shifts the prospective user fit points (not shown) in the digital photograph of the user 1001 to align the prospective user fit points with the technical mannequin fit points to generate the user fit points 1002-1024 in user image 1000 of user 1001. In this manner, the digital photo of the user is mapped onto an image of the technical mannequin in part by shifting prospective user fit points in the digital photo to align with corresponding mannequin fit points.

Rather than using a photograph of the user, some embodiments may alternatively use just a body mirroring avatar configured to substantially match the user's body shape, dimensions, weight, and height, as defined in the user's user profile (see, e.g., user profile screen 800 (FIG. 8)). In embodiments that use a body mirroring avatar, a photograph of the user is not required. Such embodiments may additionally include: (i) determining prospective user fit points for the user on the body mirroring avatar; (ii) aligning the prospective user fit points with technical mannequin fit points in a three-dimensional image of a technical mannequin; and (iii) shifting the user's prospective fit points to align with the technical mannequin fit points to generate a body mirroring avatar having user fit points that are aligned with the mannequin fit points.

Some embodiments may additionally or alternatively include mapping the digital photograph of the user onto a body mirroring avatar configured to substantially match the user's body shape, dimensions, weight, and height, as defined in the user's user profile (see, e.g., user profile screen 800 (FIG. 8)). Such embodiments may additionally include: (i) determining prospective user fit points for the user on the body mirroring avatar; (ii) aligning the prospective user fit points with technical mannequin fit points in a three-dimensional model of a technical mannequin; and (iii) shifting the user's prospective fit points to align with the technical mannequin fit points to generate a body mirroring avatar having user fit points that are aligned with the mannequin fit points.

Figure 11:
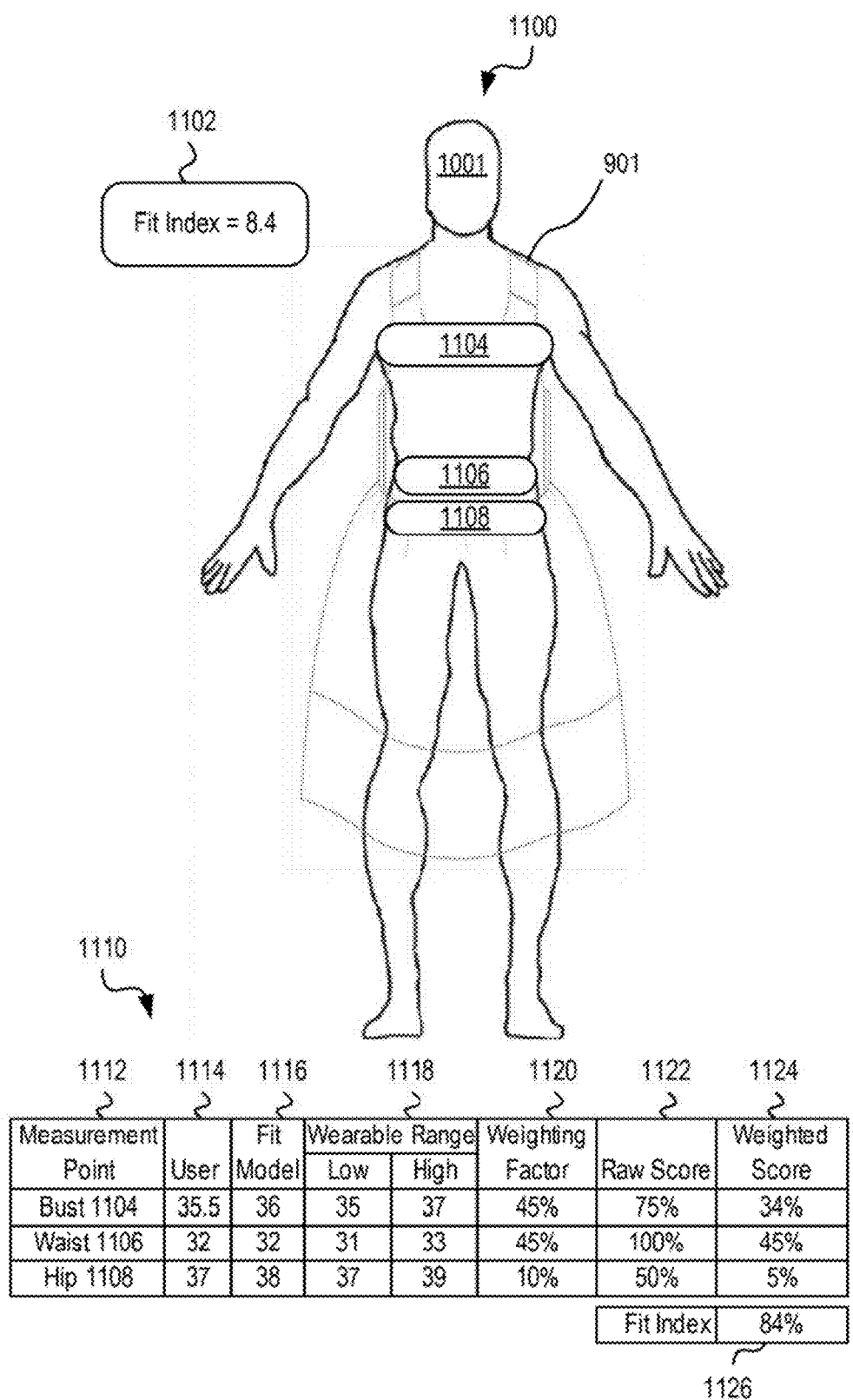
FIG. 11 shows an image of a user wearing a garment according to some embodiments.

FIG. 11 shows an example image 1100 of a user 1001 wearing a garment according to some embodiments. FIG. 11 also shows a fit index 1102 comprising a quantification of a degree to which the garment (dress 901) fits the user 1001.

In the example of FIG. 11, the image 1100 shows user 1001 wearing a size 8 of the dress 901. To generate the image 1100 of user 1001 wearing dress 901, the virtual apparel fitting system aligns the garment fit points 902-918 (FIG. 9) in the size 8 of the dress 901 with at least some of the user fit points 1002-1024 (FIG. 10) of the user 1001. Although example image 1100 is shown as a two-dimensional image in FIG. 11, other embodiment may include generating and displaying a three-dimensional image based at least in part on the methods for generating 3-D garment models and 3-D user models described herein.

FIG. 11 also shows a fit index 1102 for the garment (dress 901). In some embodiments, the fit index 1102 shows a quantitative value based at least in part on how closely one or more of the user's 1001 body measurement points match corresponding "key measurement points" in the garment. In some embodiments, the server system generates the fit index 1102 based at least in part on a difference between (i) a value of a measurement point of the user's body (which may be based on one or both of the user's actual measurements or an analysis of the user image 1000 (FIG. 10)) and (ii) a value of a corresponding key measurement point of a fit model for the garment.

For example, the "key measurement points" for dress 901 may include bust measurement point 1104, waist measurement point 1106, and hip measurement point 1108. In operation, the key measurement points may vary from garment to garment depending on the garment. Preferably, the key measurement points for a particular garment are the most important measurement points that will have the greatest bearing on how well the garment will fit (or perhaps not fit) a user. For example, those of skill in the art would readily recognize that the chest, waist, and hip measurement points are more critical to the overall fit of dress 901 than, for example, measurement points for the thigh, knee, or ankle.

In some embodiments, generating the fit index includes defining a set of one or more weighting factors, wherein each weighting factor corresponds to a key measurement point for the garment. In some embodiments, for each key measurement point of the fit model for the garment, the server system (i) determines a difference between the value of the key measurement point for the fit model of the garment and the corresponding measurement point of the user, (ii) generates a raw score by dividing the determined difference by a wearable range for the measurement point of the fit model of the garment, and (iii) multiplies the raw score by the key measurement point's corresponding weighting factor to generate a weighted score for that key measurement point of the fit model for the garment for that particular user. Then, the server system generates a fit index for the garment for that user at least in part by summing the weighted scores for each measurement point of the fit model for the garment for that user Table 1110 in FIG. 11 shows one example of how the server system can determine a fit index for a particular garment (in a particular size) for a particular user based on (i) differences between user measurements and key measurement points for the garment manufacturer's fit model (ii) a wearable range for each key measurement point, and (iii) weighting factors for each key measurement point.

Table 1110 shows the set of key measurement points 1112 for garment 901, which includes bust measurement point 1104, waist measurement point 1106, and hip measurement point 1108.

Table 1110 also shows values for the user's 1001 body measurements 1114 at the three key measurement points for the garment 901. The user's body measurements 1114 may be stored in a profile for the user 1001. In operation, the user's 1001 body measurements in her profile may be determined from one or more of (i) actual body measurements input by the user 1001 when registering with the system (e.g., FIGS. 3, 8), and/or (ii) an analysis of the user's 1001 body image 1000 (FIG. 10). In this example, the user's 1001 body measurements 1114 at the three key measurement points for garment 901 are (i) 35.5 inches in the bust, (ii) 32 inches in the waist, and (iii) 36 inches in the hips.

Table 1110 also shows values for the key measurement points of the fit model for this particular size of the garment (i.e., dress 901). As mentioned previously, the manufacturer's fit model reflects the manufacturer's "ideal" measurements for this particular size of the garment. In this example, the values for the key measurement points for the manufacturer's fit model of this particular size of the garment are (i) 36 inches in the bust, (ii) 32 inches in the waist, and (iii) 38 inches in the hips.

Table 1110 also shows a wearable range 1118 for each key measurement point for this particular size of dress 901. In some embodiments, the wearable range for each key measurement point for the manufacturer's fit model may be based on one or more of (i) a wearable range defined by the manufacturer, (ii) a wearable range determined by the server system, e.g., based on the manufacturer's grade rules, textbooks, or other guides, and/or (iii) a wearable range assigned by an operator of the server system. In some embodiments, the wearable range may be additionally or alternatively based at least in part on the type of fabric (e.g., stretchiness or stiffness), whether the garment is intended to be worn with other garments as a base layer or an outer layer, the drape or lie of the fabric, and/or perhaps other qualitative characteristics. In this example, the wearable range 1118 for each key measurement point is based on a 2 inch "grade rule" specified by the garment manufacturer. As a result, for each key measurement point, the low end of the wearable range is 1 inch less than the fit model's "ideal" and the high end of the wearable range is 1 inch greater than the fit model's "ideal" size. Here, the value of the wearable range is (i) from 35 inches to 37 inches in the bust, (ii) from 31 inches to 33 inches in the waist, and (iii) from 37 inches to 39 inches in the hips.

In some embodiments, the server system may be configured to inform the user that a particular size of a particular garment does not fit the user if any one of the user's body measurements 1114 for the key measurement points for that size of the garment are outside of the wearable range 1118 for any one of the key measurement points for that size of the garment. For instance, if the example shown in FIG. 11 corresponds to a size 6 dress, and if user's actual hip measurement exceeded 39 inches, then if the user tried to select a size 6 dress, the system may suggest that the user select a size 8 dress instead of the size 6 because the user's body measurement for one of the key measurement points falls outside the wearable range. Similarly, if the user's actual measurement was below the wearable range for a particular key measurement point, then the system may suggest that the user select a smaller size.

Table 1110 also shows a weighting factor 1120 for each key measurement point for this particular size of dress 901. In some embodiments, the weighting factor for each key measurement point for the manufacturer's fit model may be based on one or more of (i) a weighting factor defined by the manufacturer, (ii) a weighting factor determined by the server system, e.g., based on the manufacturer's grade rules, textbooks, or other guides, and/or (iii) a weighting factor assigned by an operator of the server system. In some embodiments, weighting factor may be based on a qualitative assessment of the most important measurement points for the garment, i.e., those measurement points that have the greatest impact on how well (or not) a particular garment will fit a user. In this example, the weighting factor is (i) 45% for the bust, (ii) 45% for the waist, and (iii) 10% for the hip because, based on the style of dress 901, which is designed to be tighter through the bust and waist but looser in the hips, the bust measurement point 1104 and waist measurement point 1106 are more important than the hip measurement point 1108 when determining how well (or not well) dress 901 will fit a particular user, such as user 1001.

In operation, for each measurement point, the system (i) determines a difference between the user's measurement and the fit model, (ii) generates a raw score by dividing the determined difference by the wearable range, and (iii) multiplies the raw score by a weighting factor to generate a weighted score for that measurement point. For example, for the bust measurement point 1104, the system (i) determines that the difference between the user's bust measurement of 35.5 inches and the fit model's bust measurement of 36 inches is 0.5 inches, (ii) divides the 0.5 inch difference by the wearable range of 2 inches to generate a raw score of 75% (e.g., 1−0.5/2), and (iii) multiplies the raw score of 75% by the weighting factor of 45% to generate a weighted score of 34%. Similarly, for the waist measurement point 1106, the system (i) determines that the difference between the user's waist measurement of 32 inches and the fit model's waist measurement of 32 inches is 0 inches, (ii) divides the 0 inch difference by the wearable range of 2 inches to generate a raw score of 100% (e.g., 1−0/2), and (iii) multiplies the raw score of 100% by the weighting factor of 45% to generate a weighted score of 45%. Finally, for the hip measurement point 1108, the system (i) determines that the difference between the user's hip measurement of 37 inches and the fit model's hip measurement of 38 inches is 1 inch, (ii) divides the 1 inch difference by the wearable range of 2 inches to generate a raw score of 50% (e.g., 1−1/2), and (iii) multiplies the raw score of 50% by the weighting factor of 10% to generate a weighted score of 5%.

Then, the system sums the weighted scores for each of the three measurement points to obtain the fit index, i.e., 34%+ 45%+5%=84%. In some embodiments, the system may additionally divide the calculated index by 10 to generate a value for the fit index of 1 to 10. In the example shown in FIG. 11, block 1102 shows a fit index of 8.4.

The above-described example is only one of many ways of calculating a fit index based at least in part on a difference between at least one value of a measurement point of the user and a value of a corresponding measurement point of a fit model for the garment. For example, rather than calculating a raw score based on the actual wearable range as in the above-described example, some embodiments may instead calculate the raw score based on a range that extends beyond the wearable range, e.g., by a fixed amount or perhaps by a multiple of the manufacturer's grade rule. For example, in some embodiments, the wearable range at each measurement point is within a broader calculation range for the measurement point, and such embodiments may use the calculation range rather than the wearable range to generate raw scores at each measurement point that are then used in calculating a fit index for a particular size of a garment.

In another example, the system may use a 5 inch calculation range corresponding to 2.5 times the 2 inch grade rule. The calculation range could alternatively correspond to other multiples of the grade rule. The calculation range could also be some value independent of the grade rule, such as some fixed range that is greater than the wearable range. In this example, for each measurement point, the system (i) determines a difference between the user's measurement and the fit model, (ii) generates a raw score by dividing the determined difference by the 5 inch calculation range (which is broader than the wearable range), and (iii) multiplies the raw score by a weighting factor to generate a weighted score for that measurement point. For example, for the bust measurement point 1104, the system (i) determines that the difference between the user's bust measurement of 35.5 inches and the fit model's bust measurement of 36 inches is 0.5 inches, (ii) divides the 0.5 inch difference by the calculation range of 5 inches to generate a raw score of 90% (e.g., 1−0.5/5), and (iii) multiplies the raw score of 90% by the weighting factor of 45% to generate a weighted score of 40.5%. Similarly, for the waist measurement point 1106, the system (i) determines that the difference between the user's waist measurement of 32 inches and the fit model's waist measurement of 32 inches is 0 inches, (ii) divides the 0 inch difference by the calculation range of 5 inches to generate a raw score of 100% (e.g., 1−0/5), and (iii) multiplies the raw score of 100% by the weighting factor of 45% to generate a weighted score of 45%. Finally, for the hip measurement point 1108, the system (i) determines that the difference between the user's hip measurement of 37 inches and the fit model's hip measurement of 38 inches is 1 inch, (ii) divides the 1 inch difference by the calculation range of 5 inches to generate a raw score of 80% (e.g., 1−1/5), and (iii) multiplies the raw score of 90% by the weighting factor of 10% to generate a weighted score of 8.0%.

Then, the system sums the weighted scores for each of the three measurement points to obtain the fit index, i.e., 40.5%+ 45%+8%=93.5%. In some embodiments, the system may additionally divide the calculated index by 10 to generate a value for the fit index of 1 to 10, which would be 9.4 in this example.

In still further embodiments, rather than calculating a raw score, the server system may instead lookup a raw score in a pre-configured table for the garment. In one such embodiment, for an individual measurement point, the server may (i) assign a raw score of 100% of the difference between the user measurement and the fit model measurement at the key measurement point is 0 (i.e., the user measurement=the fit model measurement), (ii) assign a raw score of 95% if the difference is less than 0.25 inches, (iii) assign a raw score of 90% if the difference is between 0.25 inches and 0.5 inches, (iv) assign a raw score of 85% if the difference is between 0.5 inches and 0.75 inches, (v) assign a raw score of 80% if the difference is between 0.75 inches and 1 inches, and so on. In operation, different garments may implement different lookup tables with different raw scores (e.g., 100%, 95%, 90%, etc.) corresponding to various difference values (0 inches, 0.25 inches, 0.25 to 0.5 inches, etc.).

Some embodiments may additionally adjust certain values for the fit model of a particular garment (or garments, or type of garments, or style of garments, for example) based on user fit preferences. In operation the system may be configured to shift one or more values for one or more measurement points of the fit model up or down by 0.5 inches or perhaps 1.0 inches or even 1.5 inches depending on how loose (or tight) the user prefers the fit as well as the measurement point (e.g., the user may prefer a looser fit in the hips than in the arms). Rather than shifting one or more values for one or more measurements points of the fit model up or down by a specific amount, some embodiments may instead shift one or more values for one or more measurement points of the fit model up or down by some percentage (e.g., up or down by 5% or 10% or some other value). For example, if user 1001 prefers a looser-than-standard fit through the bust in dresses, then the system may adjust the value of the bust measurement point 1104 for dress 901 (and perhaps for all dresses, or perhaps at least for all similarly-styled dresses) by 0.5 inches to account for the user's specific fit preference. In this example, the system will decrease the bust measurement of the ideal model from 36 inches down to 35.5 inches (and also possibly shift the wearable range or perhaps the calculation range, if applicable). By shifting the bust measurement of the ideal model from 36 inches down to 35.5 inches, the system will calculate a raw score of 100% for the bust measurement point 1104 rather than 75%, which will result in an overall higher fit index. Even though the user's body is actually 0.5 inches smaller than the manufacturer's fit model (the "ideal fit"), the system generates a higher fit index for this particular user by using this particular user's looser-than-standard fit preference than the system would have otherwise calculated had the system not adjusted the fit model to account for the user's fit preference. In this manner, the system can generate a fit for a user that is based at least in part on the user's own personal fit preference.

Regardless of the method used to determine the raw scores, the system may still determine the fit index in any of the ways described herein and then provide the fit index to the user's computing device for display to the user within a graphical user interface.

Figure 12:
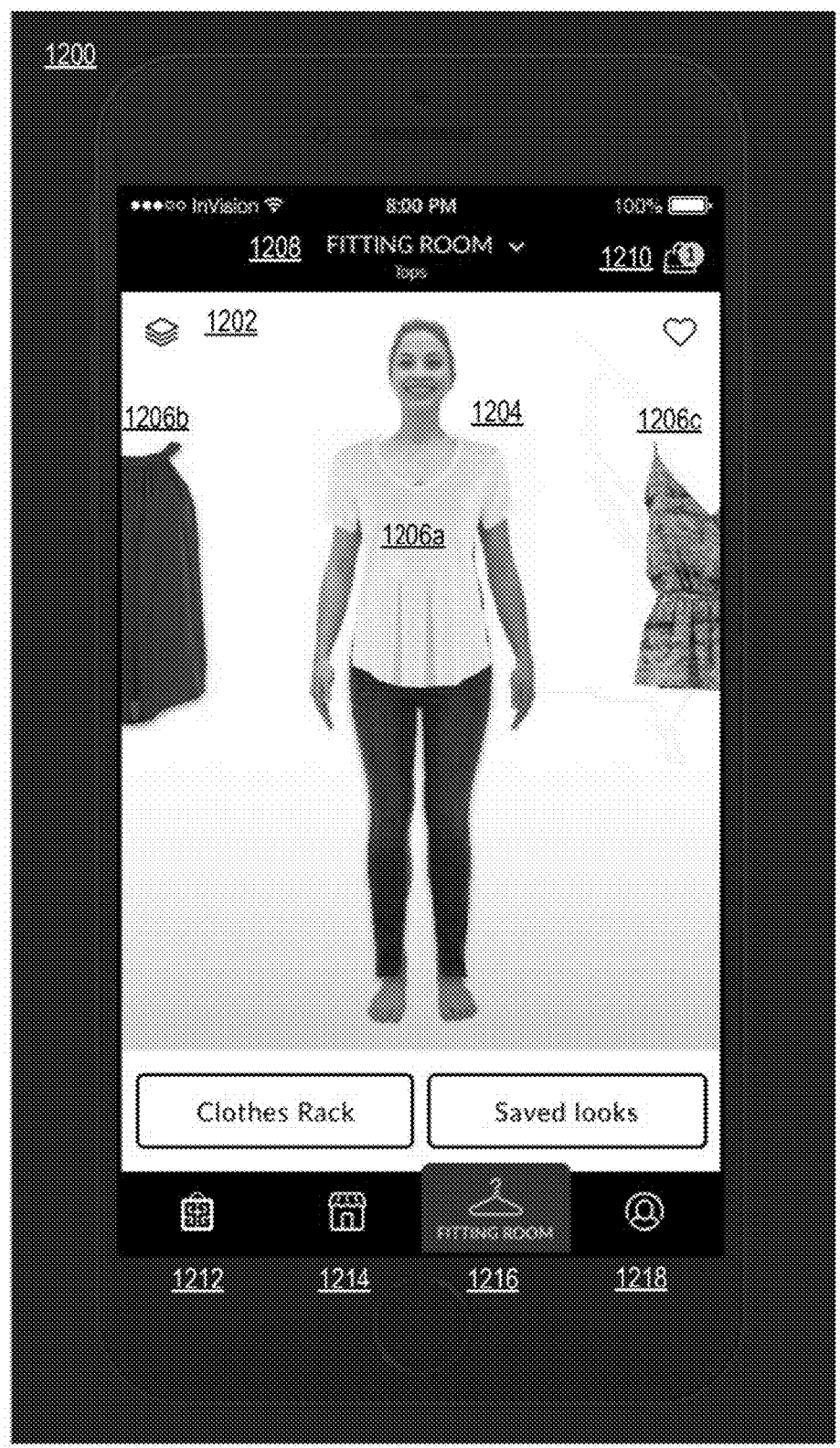
FIG. 12 is graphical representation of a virtual garment carousel according to some embodiments.

FIG. 12 is a graphical representation of a user interface showing virtual garment carousel 1200, according to some embodiments. Virtual garment carousel 1200 includes garment images 1206a, 1206b, and 1206c. In operation, the garment images 1206a-c are fitted to a user image 1204 displayed in a virtual fitting room 1202 when a user swipes left or right to navigate through the garments in the garment carousel 1200. The user interface also displays a garment type selector 1208, shopping bag 1210, and menu buttons 1212, 1214, 1216, and 1218.

In operation, the combination of user image 1204 with one of garment images 1206a, 1206b, and 1206c creates a composite image of the user wearing an outfit via the Fit Point Alignment Sub-Process described herein.

Typically, user image 1204 is a digital image that has been provided by the user via the GUI described in FIG. 4. In preferred embodiments, user image 1204 includes a full-length image of the user including fit points to allow for garment images 1206a, 1206b, and 1206c to be superposed upon user image 1204 via the Fit Point Alignment Sub-Process described herein. However, some embodiments could make use of an image that is less than a full-length image of the user (e.g., just the user's torso, just the user's legs)

Garment images 1206a, 1206b, and 1206c are images representing garments included for display in virtual garment carousel 1200. In some embodiments, the garment images 1206a, 1206b, and 1206c may have been added to the garment carousel 1200 based on one or more embodiments of the method shown and described with reference to FIG. 13. In some embodiments, garment images 1206a, 1206b, and 1206c have a plurality of pre-determined fit points that allow for superposing of garment images 1206a, 1206b, and 1206c upon user image 1204 via the Fit Point Alignment Sub-Process described herein to create the composite images of one or more garment images superposed over the user image 1204.

Garment type selection 1208 allows a user to select the type of garment to be displayed in virtual garment carousel 1200. In FIG. 12, garment type selector 1208 is set to "Tops." Other selections, which are not shown, may include pants, shorts, jackets, and sweaters. Other types of garments may exist, too.

Shopping bag 1210 includes garment selections the user has chosen to purchase or at least stored for later purchase. While not shown, in some embodiments, selecting shopping bag 1210 opens a checkout window which allows the user to purchase any saved garments from virtual garment carousel 1200.

Menu buttons 1212, 1214, 1216, and 1218 are navigation buttons that allow a user to access different parts of the user interface comprising the virtual garment carousel 1200. Menu button 1212 allows a user to access a home screen of the GUI, menu button 1214 allows a user to access a store page with all available garments, menu button 1216 allows a user to access a virtual fitting room represented by fitting room 1202, and menu button 1218 allows a user to customize a user profile.

In operation, a user takes a picture of him or herself through the process described in FIG. 4, resulting in user image 1204 for display within virtual fitting room 1202. A composite image of the user wearing garment image 1206a can then be generated and displayed. Virtual garment carousel 1200 may display garment images 1206b and 1206c to the left and right of the composite image, respectively.

If the user decides that she does not like the composite image presented, or if the user simply desires to see a new composite image of her wearing different garments, the user may issue a garment change command via virtual garment carousel 1200. In some embodiments, the garment change command includes one or more of: (i) selecting one of garment image 1206b or 1206c, (ii) performing a swiping motion in the GUI, e.g., a swiping motion to the left or right across the composite image, and/or (iii) shaking the smart phone device displaying the user interface (if a smart phone is being used).

In response to receiving a garment change command, garment images 1206a, 1206b, and 1206c are rotated (in a virtual manner) in a clockwise or counter-clockwise fashion, based on the command. For example, if the user issues a garment change command by swiping fitting room 1202 to the right, garment image 1206b may take the place of garment image 1206a, and a composite image of the user image 1204 and garment image 1206a is displayed in the user interface. Alternatively, if the user issues a garment change command by shaking her smartphone to the left, garment image 1206c may take the place of garment image 1206a, and a composite image of the user image 1204 and garment image 1206c is displayed in the user interface.

In some embodiments, after a garment change command is received, virtual garment carousel 1200 is populated with a new garment image to replace the garment image that has rotated out of the virtual fitting room 1202. For example, if the user issues a garment change command by swiping across the fitting room 1202 to the right, then (i) garment image 1206b will take the place of garment image 1206a in the composite image, (ii) garment image 1206a will take the place of garment image 1206c on the right side of fitting room 1202, (iii) garment image 1206c will rotate out of view of fitting room 1202, and (iv) virtual garment carousel 1200 displays a new garment image to replace garment image 1206b on the left side of the virtual fitting room 1202 interface.

After examining the composite image formed from the user image and garment image 1206a, the user may decide that she likes garment image 1206a, but might want to change one of the other garments in the composite image. To change another garment in the composite image, the user can select garment type selector 1208 and choose the type of garment to be changed. For example, after the user has found a desirable top while garment type selector 1208 was set to "tops," the user may then select "shorts" in garment type selector 1208 to change the virtual garment carousel to shorts. This action repopulates garment images 1206a, 1206b, and 1206c with garment images for "shorts." From here, the user can issue garment change commands to "scroll through" shorts in the virtual garment carousel, where each new garment image of shorts is superposed onto the composite image (comprised of the user image and the garment image of the previously-selected top) to create a new garment image (comprising the user image, the garment image of the previously-selected top, and the garment image of the current shorts) until the user is satisfied with the resulting composite image comprising the user image, the garment image of the previously-selected top, and the garment image of the currently-selected shorts.

After the user is satisfied with the composite image, the user can save the image to shopping bag 1210 via an outfit save command for later purchase. In this manner, the set of the selected top and the selected shorts can be saved as an "outfit" for purchase, later recall, and/or sharing via social media. After saving the selected top and shorts as an "outfit," the user can continue to scroll through other shorts, or select different types of garments via garment type selector 1208 and continue to issue garment change commands to scroll through other garments via the virtual garment carousel. The user can continue in this manner until the user and continue to save sets of 2, 3, 4 or more garments as "outfits" for purchase, later recall, and/or sharing via social media.

In some embodiments, while the user is generating an outfit with multiple types of documents (e.g., tops, pants, jackets, and so on), different garment images may overlap with one another within the composite image. For example, the user may select a top that has fit points that overlap with the fit points of a particular pair of paints. In this scenario, virtual garment carousel 1200 superimposes the fit points in the garment image of the top garment on top of the fit points in the garment image of the pair of pants. The resulting composite image gives the user a realistic picture of what the garments may look like in combination on the user's body. In operation, fit points in the user image are aligned with (i) corresponding fit points in the garment image of a first garment (e.g., an image of a top), (ii) corresponding fit points in the garment image of a second garment (e.g., an image of a pair of pants), (iii) corresponding fit points in the garment image of a third garment (e.g., an image of a jacket), and so on. In some embodiments, garment image attributes describe layers with a composite image where individual garments should be displayed, e.g., a garment image of a jacket should be displayed on top of a garment image of a top, a garment image of a scarf should be displayed on top of a garment image of a jacket, and so on. In some embodiments, the user interface presents a user with an option for layering garments, e.g., whether a top should be tucked into pants (i.e., garment image of pants displayed on top of garment image of top) or not tucked into pants (i.e., garment image of top displayed on top of garment image of pants).

After achieving a desired look for an outfit, the user can share the outfit with his or her friends via social media. In some embodiments, the user can issue an outfit share command via the graphical user interface of virtual garment carousel 1200. The outfit share command involves selecting a share button (not shown). In response to receiving the outfit share command, virtual garment carousel 1200 then posts the outfit on one or more social media networks.

In some embodiments, if a user's friend sees the shared outfit on social media and has virtual carousel 1200 installed on a computing device, he or she may be able to select the shared outfit, resulting in virtual garment carousel 1200 opening and displaying the outfit on the friend's device. In some embodiments, on the friend's device, the user interface additionally or alternatively displays a composite image of the friend wearing the same garments from the shared outfit. Because the friend's virtual carousel application on her smartphone or other device has the friend's measurements, the virtual carousel application can select garments in the friend's sizes and display a composite image of the friend and appropriately-sized garment images of the garments from the shared outfit so that the friend can see how she would look wearing the shared outfit in her size.

Figure 13:
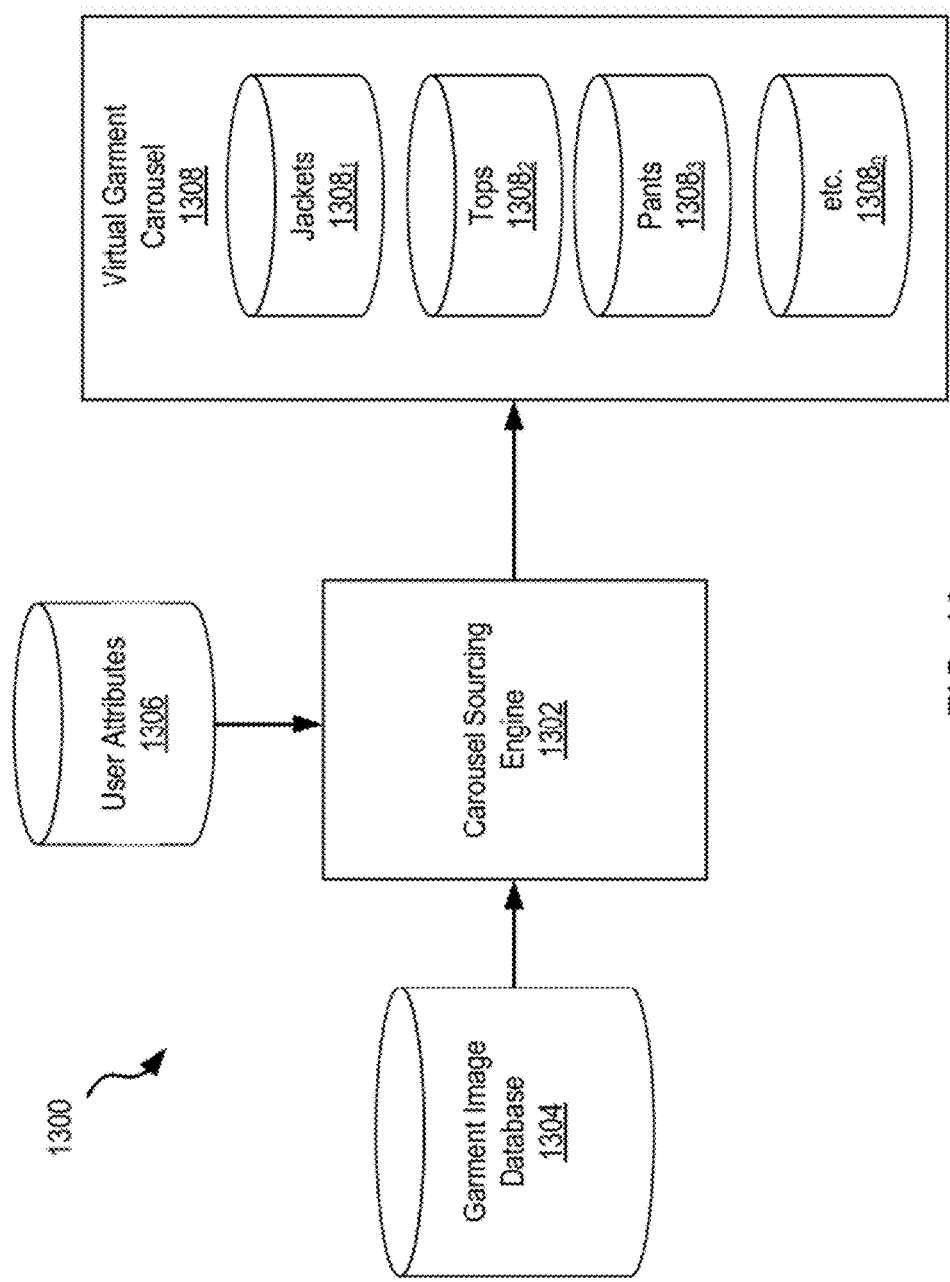
FIG. 13 is a diagram showing a carousel sourcing engine that selects garments for the virtual garment carousel, according to some embodiments.

FIG. 13 is a diagram showing a system 1300 for populating virtual garment carousel 1200 with candidate garments. System 1300 includes carousel sourcing engine 1302, garment image database 1304, user attributes 1306, and virtual garment carousel 1308.

Garment image database 1304 includes candidate garments for sale or otherwise available to be displayed via the virtual garment carousel 1308. Garment image database 1304 represents candidate garments that are ready to be sold or will be ready to sell shortly, or are otherwise available for display via the virtual garment carousel 1308.

User attributes 1306 include personal information about a particular user. This personal information includes body measurements of the user, in-app behavior of the user, location of the user, and any user preferences. The in-app behavior of the user includes information about candidate garments the user has (1) purchased, (2) viewed, (3) shared, (4) reviewed, (5) saved for later, and (6) liked or not liked.

Virtual garment carousel 1308 contains substantially the same attributes as virtual garment carousel 1200 described with reference to FIG. 12, but also includes jackets $1308_1$, tops $1308_2$, pants $1308_3$, and etc. $1308_n$. For example, the virtual carousel 1308 could be used with any type of garment now known or later developed, including but not limited to sweaters, accessories (earrings, necklaces, ties, scarves, etc.), shorts, skirts, belts, purses, shoes, and so on.

Carousel sourcing engine 1302 performs functions to populate virtual garment carousel 1308 with suggested candidate garments. Carousel sourcing engine 1302 performs functions including assessing user attributes 1306, accessing the garment database 1304, performing a garment attribute correlation, calculating a correlation score, determining whether a fit index threshold is met, performing a weighting calculation, and caching candidate garments.

Assessing user attributes 1306 includes accessing personal information about a particular user that the user has explicitly or implicitly made available to the carousel sourcing engine 1302, either directly or indirectly. This includes information provided by the user via the user interfaces shown and described with reference to FIGS. 1-8, information about the user determined by the computing system (e.g., fit points, fit indexes, etc.), information stored by the user in the virtual garment carousel 1308 (e.g., liked/disliked garments), information stored by the user in the user's computing device that the user has authorized the carousel sourcing engine 1302 to access, and/or or information from the user's social media accounts that the user has authorized the carousel sourcing engine to access.

In one example, the user may store user attributes 1306 in the virtual garment carousel 1308 in the form of viewing, reviewing, saving, or liking/not liking particular candidate garments. In another example, the user may store user attributes 1306 in the user's computing device, such as inputting a weight or height measurement into a related fitness phone application. In this example, assuming the user grants the appropriate permissions, virtual garment carousel 1308 extracts user attributes 1306 from the related fitness phone application. In another example, the user may share particular outfits from virtual garment carousel 1308 on various social media accounts. In this example, accessing user attributes 1306 includes extracting sharing and posting information from the various social media accounts.

Performing the garment attribute correlation includes correlating user attributes 1306 to garment attributes of the garments stored in garment database 1308. The garment attributes include one or more of (i) how often a stylist has recommended a candidate garment to other users, (ii) how many other users have purchased the candidate garment, (iii) how many other users have liked the candidate garment via social media, (iv) how often other users have shared composite images comprising the candidate garment via social media, (v) how many friends of the user have purchased the candidate garment, (vi) how often friends of the user have liked the candidate garment via social media, (vii) how often friends of the user have shared composite images comprising the candidate garment via social media, and (viii) a fit index that quantifies a degree to which the candidate garment fits the user.

In some embodiments, performing the garment attribute correlation may additionally include correlating candidate garments from garment database 1308 with a second garment the user has already saved in virtual garment carousel

1308. The candidate garment's relationship to the second garment includes one or more of: (i) how often a stylist has recommended a candidate garment in combination with the second garment, (ii) how many other users have purchased both the candidate garment and the second garment, (iii) how often other users have shared images showing the candidate garment with the second garment via social media, (iv) how often other users have liked images showing the candidate garment with the second garment via social media, (v) how many friends of the user have purchased both the candidate garment and the second garment, (vi) how often friends of the user have shared images showing the candidate garment with the second garment via social media, (vii) how often friends of the user have liked images showing the candidate garment with the second garment via social media, and (viii) a composite fit index that quantifies a degree to which both the candidate garment and the second garment fit the user.

Calculating a correlation score is accomplished in some embodiments by assessing the similarity of the user attributes and the garment attributes. In some example embodiments, the correlation score is a number between 0-10, with 10 being the highest correlation. For example, to calculate a correlation score for measurements, a computing device determines how many fit points of the user's measurements and the garment's measurements align. In another example, to calculate a correlation score for location, a computing device determines how geographically close the user is to a particular garment. This may be useful because it may result in a shorter shipping time, allowing the user to receive the garment faster.

In some embodiments, calculating the correlation score includes determining whether a particular garment exceeds a fit index threshold. The fit index is described in more detail with reference to FIG. 11. In operation, the fit index threshold requires the fit index to be above a certain number. In some example embodiments, the fit index for a candidate garment relative to the user must be greater than 8.5 for inclusion in the user's garment carousel, but lower or higher fit index threshold values could be used instead. In some embodiments, the fit index threshold may be configurable by the user, based at least in part on how much importance the user places on well the user wishes his or her garments to fit. In operation, embodiments where the carousel sourcing engine 1302 imposes a fit index threshold as a criterion for placing garments into a user's virtual garment carousel 1308 should preferably limit the user's virtual garment carousel 1308 to only garments that have a high likelihood of fitting the user very well.

After calculating a correlation score, carousel sourcing engine 1302 may additionally determine whether a correlation threshold has been reached. The correlation threshold requires the correlation score to be above a certain number. In some embodiments, the correlation threshold is configurable by the operator of virtual garment carousel 1308 and/or the user. In some embodiment, the correlation threshold requires a correlation score of 8.5 or higher. A measurement correlation score of 8.5 or higher suggests that the user will probably like a particular garment and that the garment has a high likelihood of fitting the user, at least for embodiments that implement the above-described fit index threshold feature. After determining that the correlation threshold has been reached, carousel sourcing engine 1302 then performs a weighting calculation.

Performing the weighting calculation involves calculating a weighted score for the garments that have exceeded correlation score threshold. In one example embodiment, performing the weighting calculation results in a weighted score for a garment comprised of 10% body measurements, 15% stylist recommendation, 5% location, 35% in-app behavior, 30% sharing, and 5% ratings and reviews. Any possible combination of weighted percentages may exist and the weighted percentages are configurable by the operator of virtual garment carousel 1308 and/or the user.

After completing the calculations, each garment has a weighted score associated with it. Carousel sourcing engine 1302 then caches the top items for display to the user via the virtual garment carousel 1308. Virtual garment carousel 1308 imports candidate garments for display from the cached items.

In operation, a user may open virtual garment carousel 1308 to browse potential garments in the hopes of buying a new outfit. The user may have, in previous sessions, saved a black v-neck t-shirt, but did not ultimately purchase the t-shirt. The user may be presented with three initial garment choices. The garment displayed on the user image may be the black v-neck t-shirt the user had previously saved, while the garments off to the left and right of virtual garment carousel 1308 may be suggested garments selected via carousel sourcing engine 1302.

In some embodiments, carousel sourcing engine 1302 additionally or alternatively selects candidate garments based on one or more personalized garment rules for a user. The one or more personalized garment rules for the user include one or more of: (i) a fit index threshold rule that selects candidate garments having a fit index for the user greater than the fit index threshold, (ii) a composite fit index threshold rule that selects candidate garments that, when combined with the second garment, result in a composite fit index greater than the fit index threshold, (iii) a color rule that selects candidate garments only from a predefined set of color families, (iv) a brand rule that selects candidate garments only from a predefined set of brands, (v) a price rule that selects candidate garments only within a predefined price range, and (vi) a fabric rule that selects candidate garments only from a predefined set of fabrics.

In some embodiments, the composite fit index threshold rule includes selecting candidate garments, that when combined with a second garment, exceed the combined fit index threshold. For example, assume a second garment has a fit index 8.6 and the composite fit index threshold is set to 8.5. If a composite fit index for the combination of a first candidate garment and the second garment would be 8.4 because of how the first candidate garment would fit over the second garment (or vice versa), the combination of the first candidate garment with the second garment would result in a composite fit index below the fit index threshold of 8.5, and thus, the carousel sourcing engine 1302 would not add the first candidate garment to the user's virtual garment carousel 1308. But if the composite fit index for the combination of the first candidate garment and the second garment would be at least 8.5 because of how the first candidate garment would fit over the second garment (or vice versa), then the carousel sourcing engine 1302 would might add the first candidate garment to the user's virtual garment carousel 1308 (assuming other criteria are met).

In some embodiments, applying the color rule involves only selecting candidate garments that harmonize with a particular color or set of colors. In some embodiments, the color rule is set by style guidelines. For example, assume a user has red hair and fair skin. In this example, it may be advantageous to avoid colors that clash with red hair, such as orange or yellow. The color rule may also be set by a user based on personal preference. For example, if a user dislikes the color purple, it would be advantageous to avoid sending that user garments that incorporate purple because there is a low likelihood that the user will like the garment, and thus, a low likelihood of a successful sale.

In some embodiments, applying the brand rule involves only selecting candidate garments from a predefined set of brands. In some embodiments, the brand rule is set by a user based on brand preference. For example, if a user has decided that she likes clothes from designer$_X$, she may set a brand rule so that she only receives candidate garments from designer$_X$. Similarly, if the user has decided that she does not like clothes from designer$_Y$, then she may set a brand rule to exclude candidate garments from designer$_Y$.

In some embodiments, applying the price rule involves only selecting candidate garments that fall within a specified price range. For example, the user may be searching for an inexpensive top to wear during a music festival. In this example, the user may set the price range for the top to $15-$30. The lower range and upper range may both be configurable by the user to allow for any number of discrete ranges.

In some embodiments, applying the fabric rule involves only selecting candidate garments from a predefined set of fabrics. In some embodiments, the fabric rule is set by a user based on fabric preference. Additionally or alternatively, in some embodiments, the fabric rule is set based on style guidelines. For example, if a user has decided that she prefers polyester fabrics to cotton fabrics, she may set a fabric rule so that she only receives candidate garments in which polyester is the main fabric. Similarly, if the user has decided that she dislikes wool clothing, then she may set a fabric rule to exclude wool garments from the set of candidate garments.

In some embodiments, after a set of candidate garments has been selected via the one or more personalized garment rules for a user, one or more style rules may then be applied to further narrow the candidate garments to a subset of garments for storage in and/or display via the virtual garment carousel. In some embodiments, the one or more style rules for the user include one or more of (i) a color clash rule that selects a subset of garments only from a predefined set of garments that do not conflict with a color attribute of the user, and (ii) a fit clash rule that selects a subset of garments only from a predefined set of garments that do not conflict with a fit attribute of the user.

In some embodiments, applying the color clash rule involves selecting a subset of garments that do not conflict with a color attribute of the user. Color attributes of the user may involve skin color, hair color, or eye color. Other color attributes may be defined, too. For example, as discussed previously, a user may have red hair, which may be entered by the user into the user's profile. In this example, it may be advantageous to select clothing that will not clash with the user's red hair. In applying the color clash rule, carousel sourcing engine 1302 may exclude candidate garments that clash with the user's red hair. This rule may rely on input from stylists or general aesthetic guidelines.

In some embodiments, applying the fit clash rule involves selecting a subset of garments that do not conflict with a fit attribute of the user. Fit attributes include body shape, weight, or specific measurements. For example, if a user is overweight, it may be advantageous to select candidate garments that are not tight-fitting, even if the fit index threshold is satisfied. Fit clash rules may be defined by style guidelines defined by and/or received from one or more stylists.

In some embodiments, the carousel sourcing engine 1302 may additionally or alternatively selects candidate garments based on a user's activity data. User activity data includes how often a user accesses virtual garment carousel 1308, such as how often on a daily, weekly, or monthly basis that the user interacts with the virtual garment carousel. Other time periods may be set, too. In operation, candidate garments are selected or refreshed more frequently for a user that accesses virtual garment carousel 1308 daily, while candidate garments are selected or refreshed less frequently for a user that accesses virtual garment carousel 1308 monthly. This may be advantageous because a user that accesses virtual garment carousel 1308 may desire more updated looks based on trends, while a user that accesses virtual garment carousel 1308 monthly may desire looks that focus on fit or another attribute other than updated trends.

In some embodiments, user activity data additionally or alternatively includes a user's shopping data. For example, if a user has purchased particular types of garments previously, it may be advantageous for virtual garment carousel 1308 to display similar types of garments to the user, because the user may be more likely to like and/or purchase that type of garment. Specifically, if a user has previously purchased halter tops via virtual garment carousel 1308 or through another website in which virtual garment carousel 1308 communicates, virtual garment carousel 1308 may select candidate garments that are substantially similar to halter tops. This information is particularly useful in developing purchasing trends for a particular user.

In some embodiments, after identifying a set of candidate garments, virtual garment carousel 1308 additionally prioritizes some candidate garments over others based on one or more of (i) a fit index rule that prioritizes candidate garments with a higher fit index for the user over candidate garments with a lower fit index for the user, (ii) a composite fit index rule that prioritizes candidate garments that result in a higher composite fix index for the user when combined with the second garment over candidate garments that result in a lower composite fix index for the user when combined with the second garment, (iii) a color rule that prioritizes candidate garments of certain colors, (iv) a brand rule that prioritizes candidate garments from certain brands over candidate garments from other brands; (v) a price rule that prioritizes candidate garments within a price range over candidate garments outside of the price range for the user; and (vi) a fabric rule that prioritizes candidate garments made from certain fabrics.

In some embodiments, prioritization includes choosing to display candidate garments that have a higher fit index first, while displaying candidate garments with a lower fit index later.

In some embodiments, prioritization includes choosing to display candidate garments that relate to a specific color first, while displaying candidate garments relating to other colors later.

In some embodiments, prioritization includes choosing to display candidate garments from a certain brand first, while displaying candidate garments relating to other brands later.

In some embodiments, prioritization includes choosing to display candidate garments in a user-specified price range first, while displaying candidate garments that fall outside of the user-specified price range later.

In some embodiments, prioritization includes choosing to display candidate garments made of a user-specified fabric first, while displaying candidate garments made of other fabrics later.

Any one or more (or all) of the above methods of prioritization may be used to select and present candidate garments to the user via virtual garment carousel 1308.

Figure 14:
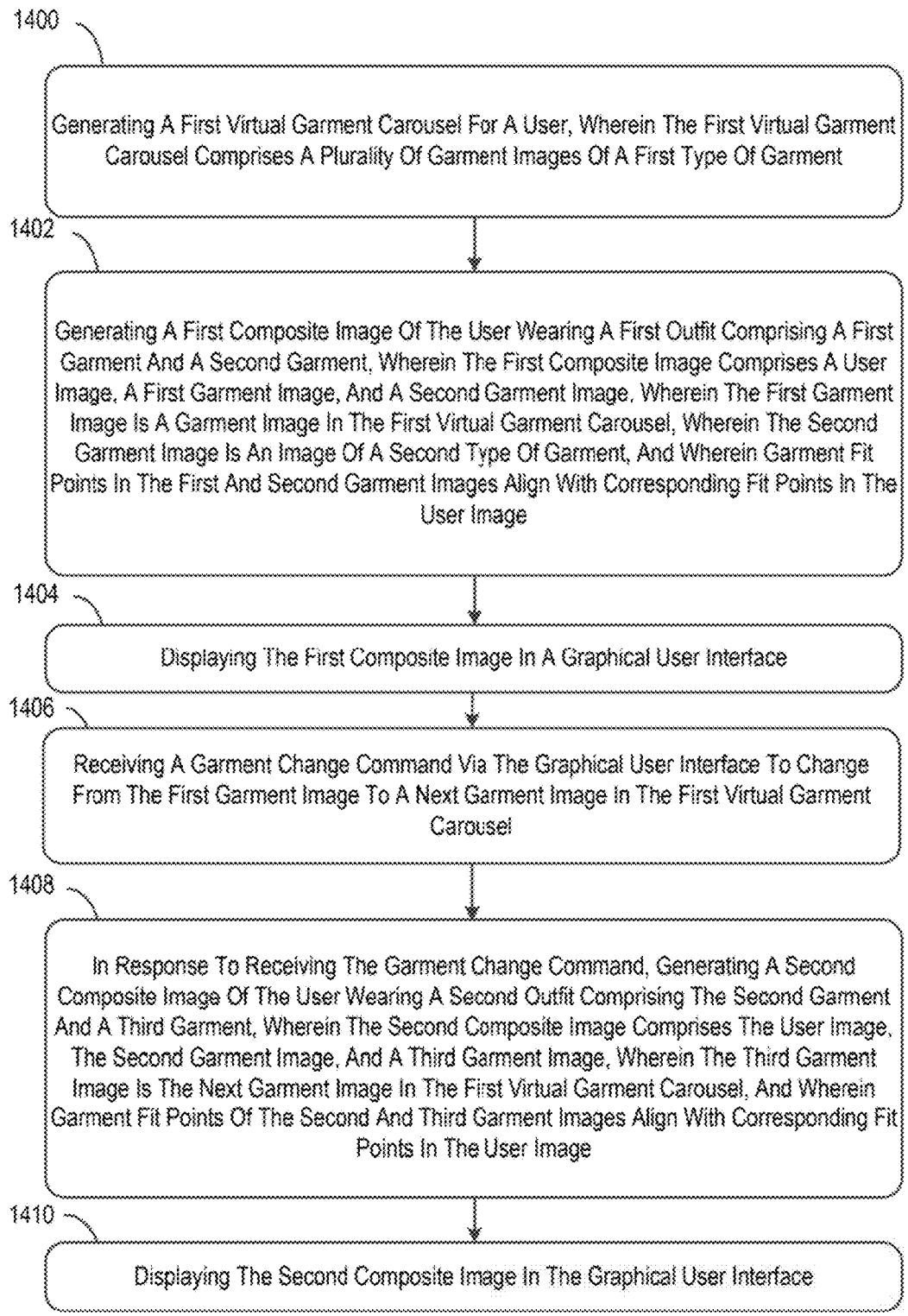
FIG. 14 is a flow chart of a method according to some embodiments.

FIG. 14 is a flow chart of a method, according to some embodiments. In some embodiments, the method illustrated by FIG. 14 is implemented by one or more computing devices, individually or in combination. For example, in some embodiments, one or more steps (or all the steps) could be performed by a server system, cloud based system, or other centralized computing system. Alternatively, one or more steps (or all the steps) could be performed by a client device, such as a smart phone, tablet, laptop computer, or other computing device. Further, some steps could be performed by a server system, cloud based system, or other centralized computing system, and other steps could be performed by a client device, such as a smart phone, tablet, laptop computer, or other computing device.

Block 1400 includes generating a first virtual garment carousel for a user. In some embodiments, the first virtual garment carousel includes a plurality of garment images of a first type of garment.

In some embodiments, the first virtual garment carousel includes at least one garment image corresponding to a garment that the user has previously (i) saved in the first virtual garment carousel or (ii) purchased.

In some embodiments, generating the first virtual garment carousel additionally or alternatively includes selecting a set of garments for the first virtual garment carousel from a plurality of candidate garments based at least in part on one or more garment attributes of each candidate garment in the plurality of candidate garments, and storing at least one garment image for each garment in the selected set of garments in the first virtual garment carousel.

In some embodiments, the garment attributes of the plurality of candidate garments include one or more of: (i) how often a stylist has recommended a candidate garment to other users, (ii) how many other users have purchased the candidate garment, (iii) how many other users have liked the candidate garment via social media, (iv) how often other users have shared composite images comprising the candidate garment via social media, (v) how many friends of the user (i.e., social media friends, contacts, etc.) have purchased the candidate garment, (vi) how often friends of the user have liked (i.e., registered a social media "like" or similar designation) the candidate garment via social media, (vii) how often friends of the user have shared composite images comprising the candidate garment via social media, and (viii) a fit index that quantifies a degree to which the candidate garment fits the user.

In some embodiments, generating the first garment carousel includes selecting a set of garments for the first virtual garment carousel from a plurality of candidate garments based at least in part on each candidate garment's relationship to the second garment, and storing at least one garment image for each garment in the selected set of garments in the first virtual garment carousel.

In some embodiments, each candidate garment's relationship to the second garment includes one or more of: (i) how often a stylist has recommended a candidate garment in combination with the second garment, (ii) how many other users have purchased both the candidate garment and the second garment, (iii) how often other users have shared images showing the candidate garment with the second garment via social media, (iv) how often other users have liked images showing the candidate garment with the second garment via social media, (v) how many friends of the user have purchased both the candidate garment and the second garment, (vi) how often friends of the user have shared images showing the candidate garment with the second garment via social media, (vii) how often friends of the user have liked images showing the candidate garment with the second garment via social media, and (viii) a composite fit index that quantifies a degree to which both the candidate garment and the second garment fit the user.

In some embodiments, generating the first virtual garment carousel includes selecting a set of garments for the first virtual garment carousel from a plurality of candidate garments based at least in part on one or more personalized garment rules for the user, and storing at least one garment image for each garment in the selected set of garments in the first virtual garment carousel.

In some embodiments, the one or more personalized garment rules for the user include one or more of: (i) a fit index threshold rule that selects candidate garments having a fit index for the user greater than a predefined fit index threshold, (ii) a composite fit index threshold rule that selects candidate garments that, when combined with the second garment, result in a composite fit index greater than a predefined composite fit index threshold, (iii) a color rule that selects candidate garments only from a predefined set of color families, (iv) a brand rule that selects candidate garments only from a predefined set of brands, (v) a price rule that selects candidate garments only within a predefined price range, and (vi) a fabric rule that selects candidate garments made only from a predefined set of fabrics.

In some embodiments, generating the virtual garment carousel further includes selecting, from the set of garments based at least in part on the one or more personalized garment rules for the user, a subset of garments based at least in part on one or more style rules for the user, and storing at least one garment image for each garment in the selected subset of garments in the first virtual garment carousel.

In some embodiments, the one or more style rules for the user comprise one or more of: (i) a color clash rule that selects a subset of garments only from a predefined set of garments that do not conflict with a color attribute of the user, and (ii) a fit clash rule that selects a subset of garments only from a predefined set of garments that do not conflict with a fit attribute of the user.

In some embodiments, generating the first virtual garment carousel for the user further includes prioritizing garments in the first virtual garment carousel for the user based on one or more of: (i) a fit index rule that prioritizes candidate garments with a higher fit index for the user over candidate garments with a lower fit index for the user, (ii) a composite fit index rule that prioritizes candidate garments that result in a higher composite fix index for the user when combined with the second garment over candidate garments that result in a lower composite fix index for the user when combined with the second garment, (iii) a color rule that prioritizes candidate garments of certain colors, (iv) a brand rule that prioritizes candidate garments from certain brands over candidate garments from other brands; (v) a price rule that prioritizes candidate garments within a price range over candidate garments outside of the price range for the user; and (vi) a fabric rule that prioritizes candidate garments made from certain fabrics.

In some embodiments, generating the first virtual garment carousel includes selecting a set of garments for the first virtual garment carousel from a plurality of candidate garments based at least in part on one or more location rules. The location rules select candidate garments based on trends where the user is located or another location based on a user's search history or other data shared with the carousel sourcing engine (FIG. 13). For example, if the user lives in Dallas, Tex., the carousel sourcing engine may select garments consistent with styles in Dallas, Tex., (perhaps based on styles trending among other users in Dallas, Tex.) over styles trending in New York, N.Y., for example. Similarly, assuming the user has granted the carousel sourcing engine appropriate permissions, the sourcing engine may select garments consistent with styles in Venice, Italy (rather than Dallas, Tex.) if other data (e.g., calendar data, browser data, email data, etc.) indicates the user is planning to take a vacation to Venice, Italy.

In some embodiments, generating the first virtual garment carousel also includes storing at least one garment image for each garment in the selected set of garments in the first virtual garment carousel.

In some embodiments, generating the first virtual garment carousel additionally or alternatively includes selecting a set of garments for the first virtual garment carousel from a plurality of candidate garments based at least in part on rules relating to a user's activity data. The user's activity data includes daily, weekly, and monthly activity, such as how often the user has interacted with the virtual carousel over the last day, week, and/or month. The rules relating to the user's activity data refreshes candidate garments in the virtual carousel more frequently for users with daily activity, less frequently for users with weekly activity, and least frequently for users with monthly activity.

In some embodiments, generating the first virtual garment carousel additionally or alternatively includes selecting a set of garments for the first virtual garment carousel from a plurality of candidate garments based at least in part on rules relating to a user's activity. In some embodiments, the user's activity includes a user's shopping data. In some embodiments, the carousel sourcing engine (FIG. 13) uses rules relating to the user's activity to select candidate garments corresponding to or otherwise related to the user's shopping data.

Block 1402 includes generating a first composite image of the user wearing a first outfit comprising a first garment and a second garment. The first composite image includes a user image, a first garment image, and a second garment image. The first garment image is a garment image in the first virtual garment carousel. The second garment image is an image of a second type of garment. In the composite image, garment fit points in the first and second garment images align with corresponding fit points in the user image.

In some embodiments, the second garment image is a garment image from a second virtual garment carousel. The second virtual garment carousel includes a plurality of garment images of the second type of garment.

Block 1404 includes displaying the first composite image in a graphical user interface.

Block 1406 includes receiving a garment change command via the graphical user interface to change from the first garment image to a next garment image in the first virtual garment carousel. The garment change command may include a swipe, an icon selection, shaking a smart phone, or any other user input that causes the virtual garment carousel to advance the carousel to a next garment.

Block 1408 includes, in response to receiving the garment change command, generating a second composite image of the user wearing a second outfit comprising the second garment and a third garment. The second composite image includes the user image, the second garment image, and a third garment image. The third garment image is the next garment image in the first virtual garment carousel, and garment fit points of the second and third garment images align with corresponding fit points in the user image.

In some embodiments, the graphical user interface, before receiving the garment change command, displays the third garment image separately from the first composite image of the first virtual garment carousel to provide a preview to the user, and wherein the graphical user interface, after receiving the garment change command, displays the first garment image separately from the second composite image of the first virtual garment carousel to provide a previous view to the user and displays a fourth garment image separately from the second composite image of the first virtual garment carousel to provide a preview to the user.

Block 1410 includes displaying the second composite image in the graphical user interface.

Some embodiments further include receiving an outfit save command from the user via the graphical user interface, and in response to receiving the outfit save command, saving at least the second composite image of the user wearing the second outfit in the tangible, non-transitory computer-readable media.

Some embodiments further include receiving an outfit share command from the user via the graphical user interface, and in response to receiving the outfit share command, sharing the second composite image of the user wearing the second outfit comprising the first garment and the third garment via one or more social media networks.

Some embodiments have been described with reference to particular features and functions. In view of the disclosure herein, it will be apparent to those skilled in the art that various modifications and variations can be made to the embodiments disclosed and described herein without departing from the scope or spirit of the invention(s) and the example embodiments thereof disclosed and described herein. One skilled in the art will recognize that the disclosed features and functions may be used singularly, in any combination, or omitted based on the requirements and specifications of a given application or design.

We claim:

1. Tangible, non-transitory computer-readable media comprising instructions encoded therein, wherein the instructions, when executed by one or more processors, cause a computing system to perform a method comprising:
    generating a first virtual garment carousel for a user, wherein the first virtual garment carousel comprises a plurality of garment images of a first type of garment, wherein generating the first virtual garment carousel for the user comprises: (i) selecting a set of garments for the first virtual garment carousel from a plurality of candidate garments based at least in part on rules relating to a user's activity data, wherein the user's activity data comprises daily, weekly, and monthly activity, and wherein the rules relating to the user's activity data refresh candidate garments most frequently for users with daily activity, less frequently for users with weekly activity, and least frequently for users with monthly activity and (ii) storing at least one garment image for each garment in the selected set of garments in the first virtual garment carousel;
    generating a first composite image of the user wearing a first outfit comprising a first garment and a second garment, wherein the first composite image comprises a user image, a first garment image, and a second garment image, wherein the first garment image is a garment image in the first virtual garment carousel, wherein the second garment image is an image of a second type of garment, and wherein garment fit points in the first and second garment images align with corresponding fit points in the user image;

displaying the first composite image in a graphical user interface;

receiving a garment change command via the graphical user interface to change from the first garment image to a next garment image in the first virtual garment carousel;

in response to receiving the garment change command, generating a second composite image of the user wearing a second outfit comprising the second garment and a third garment, wherein the second composite image comprises the user image, the second garment image, and a third garment image, wherein the third garment image is the next garment image in the first virtual garment carousel, and wherein garment fit points of the second and third garment images align with corresponding fit points in the user image; and displaying the second composite image in the graphical user interface.

2. The tangible, non-transitory computer-readable media of claim 1, wherein at least some fit points in the first garment image align with at least some fit points in the second garment image, and wherein at least some fit points in the third garment image align with at least some fit points in the second garment image.

3. The tangible, non-transitory computer-readable media of claim 1, wherein the second garment image is a garment image from a second virtual garment carousel, wherein the second virtual garment carousel comprises a plurality of garment images of the second type of garment.

4. The tangible, non-transitory computer-readable media of claim 3, wherein generating the second virtual garment carousel for the user comprises:

selecting a set of garments for the second virtual garment carousel from a plurality of candidate garments based at least in part on rules relating to the user's activity data, wherein the user's activity data comprises daily, weekly, and monthly activity, and wherein the rules relating to the user's activity data refresh candidate garments most frequently for users with daily activity, less frequently for users with weekly activity, and least frequently for users with monthly activity; and storing at least one garment image for each garment in the selected set of garments in the second virtual garment carousel.

5. The tangible, non-transitory computer-readable media of claim 1, wherein the first virtual garment carousel comprises at least one garment image corresponding to a garment that the user has previously (i) saved in the first virtual garment carousel or (ii) purchased.

6. The tangible, non-transitory computer-readable media of claim 1, wherein the set of garments for the first virtual garment carousel is additionally based at least in part on one or more garment attributes of each candidate garment in the plurality of candidate garments.

7. The tangible, non-transitory computer-readable media of claim 6, wherein the garment attributes of the plurality of candidate garments comprise one or more of: (i) how often a stylist has recommended a candidate garment to other users, (ii) how many other users have purchased the candidate garment, (iii) how many other users have liked the candidate garment via social media, (iv) how often other users have shared composite images comprising the candidate garment via social media, (v) how many friends of the user have purchased the candidate garment, (vi) how often friends of the user have liked the candidate garment via social media, (vii) how often friends of the user have shared composite images comprising the candidate garment via social media, and (viii) a fit index that quantifies a degree to which the candidate garment fits the user.

8. The tangible, non-transitory computer-readable media of claim 1, wherein the set of garments for the first virtual garment carousel is additionally based at least in part on each candidate garment's relationship to the second garment.

9. The tangible, non-transitory computer-readable media of claim 8, wherein each candidate garment's relationship to the second garment comprises one or more of: (i) how often a stylist has recommended a candidate garment in combination with the second garment, (ii) how many other users have purchased both the candidate garment and the second garment, (iii) how often other users have shared images showing the candidate garment with the second garment via social media, (iv) how often other users have liked images showing the candidate garment with the second garment via social media, (v) how many friends of the user have purchased both the candidate garment and the second garment, (vi) how often friends of the user have shared images showing the candidate garment with the second garment via social media, (vii) how often friends of the user have liked images showing the candidate garment with the second garment via social media, and (viii) a composite fit index that quantifies a degree to which both the candidate garment and the second garment fit the user.

10. The tangible, non-transitory computer-readable media of claim 1, wherein the set of garments for the first virtual garment carousel is additionally based at least in part on one or more personalized garment rules for the user.

11. The tangible, non-transitory computer-readable media of claim 10, wherein the one or more personalized garment rules for the user comprises one or more of: (i) a fit index threshold rule that selects candidate garments having a fit index for the user greater than a predefined fit index threshold, (ii) a composite fit index threshold rule that selects candidate garments that, when combined with the second garment, result in a composite fit index greater than a predefined composite fit index threshold, (iii) a color rule that selects candidate garments only from a predefined set of color families, (iv) a brand rule that selects candidate garments only from a predefined set of brands, and (v) a price rule that selects candidate garments only within a predefined price range.

12. The tangible, non-transitory computer-readable media of claim 11, wherein generating the first virtual garment carousel for a user further comprises:

selecting, from the set of garments based at least in part on the one or more personalized garment rules for the user, a subset of garments based at least in part on one or more style rules for the user.

13. The tangible, non-transitory computer-readable media of claim 12, wherein the one or more style rules for the user comprise one or more of: (i) a color clash rule that selects subset garments only from a predefined set of garments that do not conflict with a color attribute of the user, and (ii) a fit clash rule that selects subset garments only from a predefined set of garments that do not conflict with a fit attribute of the user.

14. The tangible, non-transitory computer-readable media of claim 1, wherein generating the first virtual garment carousel for the user further comprises:

prioritizing garments in the first virtual garment carousel for the user based on one or more of: (i) a fit index rule that prioritizes candidate garments with a higher fit index for the user over candidate garments with a lower fit index for the user, (ii) a composite fit index rule that prioritizes candidate garments that result in a higher composite fix index for the user when combined with the second garment over candidate garments that result in a lower composite fix index for the user when combined with the second garment, (iii) a color rule that prioritizes candidate garments of certain colors, (iv) a brand rule that prioritizes candidate garments from certain brands over candidate garments from other brands, and (v) a price rule that prioritizes candidate garments within a price range over candidate garments outside of the price range for the user.

15. The tangible, non-transitory computer-readable media of claim 1, wherein the method further comprises:
receiving an outfit save command from the user via the graphical user interface; and
in response to receiving the outfit save command, saving at least the second composite image of the user wearing the second outfit in the tangible, non-transitory computer-readable media.

16. The tangible, non-transitory computer-readable media of claim 1, wherein the method further comprises:
receiving an outfit share command from the user via the graphical user interface; and
in response to receiving the outfit share command, sharing the second composite image of the user wearing the second outfit comprising the first garment and the third garment via one or more social media networks.

17. The tangible, non-transitory computer-readable media of claim 1, wherein the graphical user interface, before receiving the garment change command, displays the third garment image separately from the first composite image of the first virtual garment carousel to provide a preview to the user, and wherein the graphical user interface, after receiving the garment change command, displays the first garment image separately from the second composite image of the first virtual garment carousel to provide a previous view to the user and displays a fourth garment image separately from the second composite image of the first virtual garment carousel to provide a preview to the user.

18. The tangible, non-transitory computer-readable media of claim 1, wherein the set of garments for the first virtual garment carousel is additionally based at least in part on one or more location rules, wherein the location rules select candidate garments based on trends where the user is located or another location based on a user's search history.

19. The tangible, non-transitory computer-readable media of claim 1, wherein the set of garments for the first virtual garment carousel is additionally based at least in part on rules relating to a user's activity, wherein the user's activity comprises a user's shopping data, and wherein the rules relating to the user's activity select candidate garments corresponding to the user's shopping data.

* * * * *